US011717748B2

(12) United States Patent
Bleasdale-Shepherd et al.

(10) Patent No.: US 11,717,748 B2
(45) Date of Patent: Aug. 8, 2023

(54) LATENCY COMPENSATION USING MACHINE-LEARNED PREDICTION OF USER INPUT

(71) Applicant: Valve Corporation, Bellevue, WA (US)

(72) Inventors: Iestyn Bleasdale-Shepherd, Bellevue, WA (US); Scott Dalton, Seattle, WA (US); Richard Kaethler, Redmond, WA (US)

(73) Assignee: Valve Corporation, Bellevue, WA (US)

( * ) Notice: Subject to any disclaimer, the term of this patent is extended or adjusted under 35 U.S.C. 154(b) by 253 days.

(21) Appl. No.: 16/688,833

(22) Filed: Nov. 19, 2019

(65) Prior Publication Data

US 2021/0146241 A1    May 20, 2021

(51) Int. Cl.
*A63F 13/358*    (2014.01)
*A63F 13/355*    (2014.01)
(Continued)

(52) U.S. Cl.
CPC .......... *A63F 13/355* (2014.09); *A63F 13/332* (2014.09); *A63F 13/358* (2014.09);
(Continued)

(58) Field of Classification Search
CPC .... A63F 13/355; A63F 13/332; A63F 13/358; A63F 13/86; A63F 13/335;
(Continued)

(56) References Cited

U.S. PATENT DOCUMENTS

2002/0142843 A1    10/2002   Roelofs
2014/0365412 A1*   12/2014   Mizrachi ............... G06N 5/047
                                                            706/14
(Continued)

FOREIGN PATENT DOCUMENTS

WO        2019075132 A1    4/2019

OTHER PUBLICATIONS

"Minimizing real-time prediction serving latency in machine learning", Feb. 14, 2019, retrieved on Jan. 14, 2022, https://cloud.google.com/architecture/minimizing-predictive-serving-latency-in-machine-learning (Year: 2019).*

(Continued)

*Primary Examiner* — James S. McClellan
*Assistant Examiner* — Ross A Williams
(74) *Attorney, Agent, or Firm* — Lee & Hayes, P.C.

(57) ABSTRACT

A trained machine learning model(s) is used to determine scores indicative of probabilities that certain types of user input will be provided to a player's game controller while playing a video game in order to compensate for latency between player action and player perception of video game content relating to the player action. In an example process, sensor data received from a client machine and/or game state data received from a video game is provided as input to a trained machine learning model(s), and a score as output therefrom, the score relating to a probability that a type of user input will be provided to a player's game controller. In this manner, game control data corresponding to the type of user input can be generated based on the score and provided to the video game as input before actual game control data is even received, thereby compensating for latency.

23 Claims, 7 Drawing Sheets

(51) Int. Cl.
    *A63F 13/86*     (2014.01)
    *H04N 21/478*     (2011.01)
    *A63F 13/332*     (2014.01)
    *H04L 67/131*     (2022.01)
    *A63F 13/335*     (2014.01)

(52) U.S. Cl.
    CPC ............ *A63F 13/86* (2014.09); *H04L 67/131* (2022.05); *H04N 21/4781* (2013.01); *A63F 13/335* (2014.09)

(58) Field of Classification Search
    CPC ...... A63F 13/6786; A63F 13/67; H04L 67/38; H04N 21/4781; G06N 20/00
    See application file for complete search history.

(56) References Cited

U.S. PATENT DOCUMENTS

2015/0134572 A1*   5/2015   Forlines ................. G06N 5/048
    706/11
2017/0124474 A1*   5/2017   Kashyap ................ G06N 20/00
2020/0306632 A1*  10/2020   Kolen ................... A63F 13/352

OTHER PUBLICATIONS

Adit Deshpande, How I Used Deep Learning To Train A Chatbot To Talk Like Me (Sorta)—Aug. 10, 2017 https://web.archive.org/web/20170810190709/https://adeshpande3.github.io/How-I-Used-Deep-Learning-to-Train-a-Chatbot-to-Talk-Like-Me (Year: 2017).*
Ricky Pusch, Explaining how fighting games use delaybased and rollback netcode, Oct. 18, 2019 https://arstechnica.com/gaming/2019/10/explaining-how-fighting-games-use-delay-based-and-rollback-netcode/ (Year: 2019).*
PCT Search Report and Written Opinion for PCT application No. PCT/US20/60504, dated Feb. 12, 2021, 11 pages.
International Preliminary Report on Patentability for PCT Application No. PCT/US20/60504, dated Jun. 2, 2022, 10 pages.

* cited by examiner

LATENCY COMPENSATION USING MACHINE-LEARNED PREDICTION OF USER INPUT

BACKGROUND

The constant, or nearly constant, availability of wide area network communications, in combination with increasing capabilities of client machines and wireless communication protocols, has caused a rise in popularity of networked video game platforms, including cloud-based video game streaming platforms where players use "thin clients" to play video games that are executing on remote servers, as well as in-home video game streaming platforms. Despite advances in networked video game platforms, various factors can still cause latency to arise between player action and player perception in a video game. In video game streaming platforms, for example, network congestion can cause a noticeable delay between player action and player perception. Other factors that may contribute to latency between player action and player perception are the data transfer rate of the network, the bandwidth or capacity of available computing resources (e.g., processing resources, memory resources, display resources, etc.), the utilization of those computing resources, and/or the complexity of the video game itself (e.g., more-data-intensive video games with complex graphics tend to experience more latency than less-data-intensive video games with relatively simple graphics). Some genres of video games, such as first-person shooter games, are quite sensitive to latency, which causes play quality to be severely degraded whenever latency arises.

Dead reckoning is one example of an existing approach that attempts to compensate for latency observed in networked video game platforms. Using dead reckoning, a server computer determines a player-controlled character's past positions, velocities, and/or accelerations over some time period (e.g., over the last 200 milliseconds), and that past data can be used to predict the future positions of the player-controlled character in order to compensate for latency. However, dead reckoning remains a relatively unsophisticated approach for predicting future player actions, which oftentimes results in inaccurate predictions, and is therefore used sparingly in today's networked video game platforms. Without viable mechanisms for accurately predicting future player actions, latency cannot be compensated for in a practicable manner, and the play quality of many video games continues to degrade whenever latency arises. The disclosure made herein is presented with respect to these and other considerations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
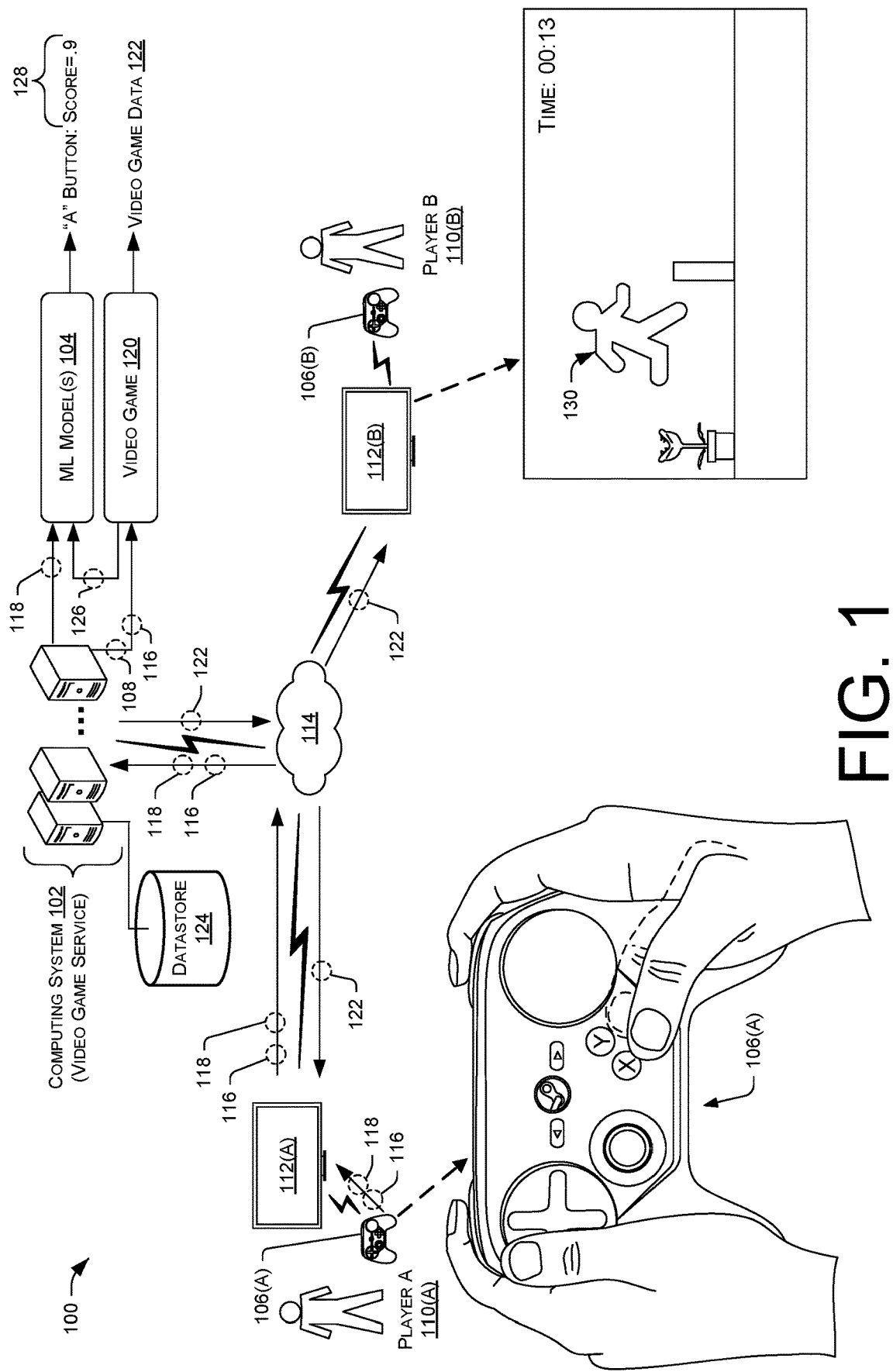
FIG. 1 is a diagram illustrating an example environment that includes a computing system configured to train and use a machine learning model(s) to predict user input to a player's video game controller and to proactively generate corresponding game control data to compensate for latency.

Described herein are, among other things, techniques, devices, and systems for predicting user input to a video game controller using a trained machine learning model(s), and proactively generating corresponding game control data in order to compensate for latency between player action and player perception. The disclosed techniques may be implemented, at least in part, by a remote computing system that provides a video game service for a user community to play video games using client machines that are configured to access the video games from the computing system. These client machines may individually install a client application that is configured to execute, and/or output content of, video games received (e.g., downloaded, streamed, etc.) from the remote computing system. This video game platform enables registered users of the community to play video games as "players." For example, a player can load the client application, login with a registered user account, select a desired video game, and play the video game, which can execute on his/her client machine via the client application, or execute at the remote computing system so that video game data is streamed to the client machine for output thereon.

Whenever the above-mentioned users access and use this video game platform, data may be collected by the remote computing system, and this data can be maintained by the remote computing system. For example, game state data that includes game states of a video game (e.g., player movement, positions in game maps, character classes, weapons, etc.) that occurred during past sessions of the video game may be collected and maintained by the remote computing system. Additionally, or alternatively, sensor data generated by game controllers and received from client machines during past video game sessions can be collected and maintained by the remote computing system. Because today's game controllers are equipped with more and more sensors (e.g., gyroscopes, accelerometers, touch sensors, pressure sensors, etc.), the resulting sensor data generated by these sensors can be leveraged for purposes of predicting user input to such game controllers for purposes of latency compensation, as described herein. To illustrate, whenever players play video games via the video game platform, the players may use game controllers to control an aspect(s) of the video game. A given game controller may include one or more sensors, such as, without limitation, a gyroscope(s), an accelerometer(s), and/or a touch sensor(s), among other possible sensors. A touch sensor(s) (e.g., a capacitive pad(s)) may be disposed underneath or on a surface of the device, and/or within or on a finger-operated control. This touch sensor(s) may be configured to detect proximity of a finger(s) to the surface or to the finger-operated control, and, in response, the touch sensor(s) may generate sensor data indicative of the proximity of the finger(s) to the touch sensor(s). As another example, a gyroscope(s) and/or accelerometer(s) mounted in the housing of the game controller may detect movement of the game controller in different directions (e.g., moving—such as by translational, rotational, and/or tilting movement), and, in response, the gyroscope(s) and/or accelerometer(s) may generate sensor data indicative of a characteristic(s) of this movement. In general, the sensor data can be utilized for various purposes, such as to control an aspect(s) of a video game (e.g., to control a player-controlled character, to rotate a virtual camera that dictates what is visible on the display, etc.). When the sensor data is used as game control data in this manner, the sensor data may, in some cases, be altered (e.g., filtered/dampened, amplified, etc.) before it is used to control the aspect(s) of the video game. However, the techniques and systems described herein are directed to a game controller that is configured to send raw, unfiltered sensor data generated by one or more sensors of the game controller to the remote computing system (e.g., by sending the sensor data via an associated client machine). This raw sensor data may be sent along with the game control data (e.g., data generated by button presses, deflections of joysticks, etc., as well as altered sensor data) that is to be processed for controlling an aspect of the video game.

Over time, one can appreciate that a large collection of historical data tied to past sessions of video games played by a player community may be available to the remote computing system. The remote computing system can then train one or more machine learning models using a portion of the historical data as training data. For instance, historical sensor data—which was generated by one or more physical sensors of game controllers and received by the remote computing system during past sessions of video games—can be used as training data. As another example, historical game state data—which includes game states of video games that occurred during past sessions of the video games—can be used as training data, either alone or in combination with the sensor data. The sensor data and/or game state data can be represented by a set of features and labeled to indicate one of multiple types of user input that caused corresponding game control data to be received within a time period since the sensor data was received and/or since the game states occurred.

A machine learning model(s) trained on this data is able to predict a type of user input that will be provided to a player's game controller, such as by generating a score indicative of a probability that a certain type of user input will be provided to the game controller. These machine-learned scores are usable for proactively generating game control data in real-time that corresponds to the predicted type of user input so that the game control data can be input to a video game in advance of receiving the actual game control data from a client machine, which compensates for latency because the computing system does not wait for the actual game control data to be received from the client machine. As mentioned above, video game platforms may be subjected to latency between player action and player perception in a video game, such as a video game being played in multiplayer mode by multiple players over a computer network. For instance, there may be a time delay between a first time at which a first player provides user input to a game controller to control a character of the video game and a second time at which the remote computing system receives the corresponding game control data from the first player's client machine. If this time delay (or latency) is not compensated for, the corresponding movement of the player-controlled character that is presented on a display of a second player's client machine may be delayed relative to the first player's action(s) controlling the video game character, which can degrade the play quality of the video game. The disclosed techniques for latency compensation using machine-learned prediction of user input to a player's game controller allows for predicting future player actions with relatively high accuracy, as compared to existing approaches, like dead reckoning. In this manner, the remote computing system may predict, with improved accuracy, a type of user input that will be provided by a player in advance of the remote computing system receiving the actual game control data that corresponds to the upcoming user input. This may allow a second player to perceive a first player's character do something that the first player will most likely control the character to do, and to perceive it before the remote computing system even receives the actual game control data from the first player's client machine that pertains to first player's action(s).

In an example process, a computing system may receive sensor data from a client machine associated with a player of a video game while the video game is being played (e.g., in multiplayer mode). The sensor data may comprise raw sensor data generated by one or more physical sensors of a game controller (e.g., raw gyroscope data, raw accelerometer data, and/or raw capacitive sensor data, etc.). The computing system may provide the sensor data as input to a trained machine learning model(s) to predict user input to the game controller that will cause corresponding game control data to be received from the player's client machine within a time period since receiving the sensor data. The trained machine learning model(s) is configured to process the sensor data and generate a score as output, the score indicative of a probability that a type of user input will be provided to the game controller. Based at least in part on the machine-learned score, the computing system may generate, on behalf of the player, game control data that corresponds to the type of user input, and may provide the proactively-generated game control data to the video game as input so that video game data that is output from the video game can be sent to a client machine (e.g., a second client machine of a second player of the video game) to compensate for latency of the video game platform.

In another example process, a computing system may receive game state data from a video game executing in multiplayer mode. The game state data may comprise a game state of the video game (e.g., player movement, a position in a game map, a character class, a weapon, etc.). The computing system may provide the game state data as input to a trained machine learning model(s) to predict user input to a game controller of a given player that will cause corresponding game control data to be received from the player's client machine within a time period since receiving the game state data. The trained machine learning model(s)

is configured to process the game state data and to generate a score as output, the score indicative of a probability that a type of user input will be provided to the game controller. Based at least in part on the machine-learned score, the computing system may generate, on behalf of the player, game control data that corresponds to the type of user input, and may provide the proactively-generated game control data to the video game as input so that video game data that is output from the video game can be sent to a client machine (e.g., a second client machine of a second player of the video game) to compensate for latency of the video game platform. In some embodiments, both sensor data and game state data may be provided as input to a trained machine learning model(s) in order to predict user input to a game controller for purposes of latency compensation.

The techniques and systems described herein may provide an improved gaming experience for players of a video game. This is because the techniques and systems described herein are able to predict user input to game controllers and to proactively generate corresponding game control data ahead of a time when actual game control data generated by those controllers is received at the computing system. For example, the trained machine learning model(s) described herein can learn to predict when a player is about to provide a type of user input to control a character in the video game to jump over a wall, abruptly turn left, etc. This predictive capability not only compensates for latency so that coherency between multiple players of a multiplayer video game is maintained, but it also allows for animation enhancements to be provided for a more realistic visual experience. For example, if the computing system predicts that a player is about to actuate the "A" button to control a character in the video game to jump over a wall, the animation of this player-controlled character can be enhanced based on the machine-learned prediction in order to render the "leading motion" of the character, which may depict a shift in weight of the player-controlled character and/or a crouching motion of the character slightly before jumping. Meanwhile, the actual "jump" of the character can still be rendered in close synchronization with the player actuating the "A" button due to the predictive capability of the system. Without such animation enhancement and machine-learned predictions of user input, a video game may output frames that either show snappy and responsive animations without any lead-in animation (e.g., a character suddenly transitions from running to jumping over a wall in an unrealistic manner), or the lead-in animation is shown over multiple frames, but it is slow and unresponsive (e.g., the jump occurs with a noticeable delay from the time of the button press). The techniques and systems described herein allow for providing a video game experience to a player community that includes "the best of both worlds" by virtue of rendering animation enhancements (e.g., lead-in animations) without any noticeable time lag so that the actions of objects and characters in the video game look realistic and remain responsive to the user input provided by the players.

While many examples provided herein pertain to a trained machine learning model(s) that resides and executes on a remote computing system, it is to be appreciated that the computing system that utilizes the trained machine learning model(s) to predict user input may be a client machine that is collocated with a user playing a video game. That is, although training may occur at the remote computing system, the trained machine learning model(s) may be downloaded to client machines for execution of the trained machine learning model(s) on the client machines themselves (either in lieu of, or in addition to, executing a trained machine learning model(s) on the remote computing system). In these embodiments, the client machines may utilize a common machine learning model(s), and/or multiple client machines may each utilize a different machine learning model(s). For example, user-specific machine learning models can be trained on historical data specific to particular users and downloaded to the client machines of those users, instead of, or in addition to, training a machine learning model(s) on aggregate data gathered from an entire player population.

Because a machine-learning model(s) can learn to identify complex relationships within sensor data, game state data, and/or game control data that may be utilized as training data, the techniques and systems described herein allow for accurately predicting user input to game controllers, which results in lower false positive rates and fewer instances of predicting player actions incorrectly. The techniques and systems described herein are also more adaptive to changing dynamics of player behavior than existing systems (e.g., systems that use dead reckoning for forward prediction of player behavior) because a machine learning model(s) is/are retrainable with new data in order to adapt the machine learning model(s) understanding of player actions over time, as player behavior changes. Furthermore, a machine learning model(s) is/are capable of accounting for many more variables and a much greater variety of user behaviors than can reasonably be accounted for in a manually-constructed system. The techniques and systems described herein may further allow one or more devices to conserve resources with respect to processing resources, memory resources, networking resources, etc., in the various ways described herein.

FIG. 1 is a diagram illustrating an example environment 100 that includes a computing system 102 configured to train and use a machine learning model(s) 104 to predict user input to a player's video game controller 106, and to proactively generate corresponding game control data 108 to compensate for latency. A community of players 110 (sometimes referred to herein as "users" 110) may be associated with respective client machines 112, and with respective video game controllers 106 (sometimes referred to herein as "game controllers" 106). In the example of FIG. 1, a first client machines 112(A) is shown as being associated with, and utilized by, a first player 110(A), while a second client machine 112(B) is shown as being associated with, and utilized by, a second player 110(B). A first game controller 106(A) is also associated with, and utilized by, the first player 110(A), while a second game controller 106(B) is associated with, and utilized by, the second player 110(B). It is to be appreciated that any number of players 110 and client machines 112 can be implemented in the environment 100, such as a single player 110 with a single client machine 112, or more than two players 110 with more than two client machines 112.

The client machines 112 shown in FIG. 1 can be implemented as any suitable type of computing device configured to execute video games and/or to render graphics on an associated display, including, without limitation, a personal computer (PC), a desktop computer, a laptop computer, a mobile phone (e.g., a smart phone), a tablet computer, a portable digital assistant (PDA), a wearable computer (e.g., virtual reality (VR) headset, augmented reality (AR) headset, smart glasses, etc.), an in-vehicle (e.g., in-car) computer, a television (smart television), a set-top-box (STB), a game console, and/or any similar computing device. Furthermore, the client machines 112 may vary in terms of their respective platforms (e.g., hardware and software). For example, the two client machines 112(A) and 112(B) shown in FIG. 1 may represent different types of client machines 112 with varying capabilities in terms of processing capabilities (e.g., central processing unit (CPU) models, graphics processing unit (GPU) models, etc.), graphics driver versions, and the like, The client machines 112 may communicate with the remote computing system 102 (sometimes shortened herein to "computing system 102," or "remote system 102") over a computer network 114. The computer network 114 may represent and/or include, without limitation, the Internet, other types of data and/or voice networks, a wired infrastructure (e.g., coaxial cable, fiber optic cable, etc.), a wireless infrastructure (e.g., radio frequencies (RF), cellular, satellite, etc.), and/or other connection technologies. The computing system 102 may, in some instances be part of a network-accessible computing platform that is maintained and accessible via the computer network 114. Network-accessible computing platforms such as this may be referred to using terms such as "on-demand computing", "software as a service (SaaS)", "platform computing", "network-accessible platform", "cloud services", "data centers", and so forth.

It is to be appreciated that the computer network 114 of FIG. 1 may, in some embodiments, represent a local area network (LAN), which may be the case in an "in-home" video game streaming scenario. In this scenario, the computing system 102 may represent a host computing system that is located in, or near, the same geographical location of the client machines 112. In some embodiments, the computer network 114 may represent a wide area network (WAN), such as the Internet, and the client machines 112(A) and 112(B) may be located in different geographical locations. In some embodiments, the client machines 112 may be implemented as "thin-clients" that are configured to send and receive data to and from the computing system 102 with minimal data processing on the client machine 112 itself (e.g., without having to execute a video game on the client machine 112 itself). In a thin-client implementation, the computing system 102 may receive, among other data, game control data from the client machines 112, and the computing system 102 may send video game data (e.g., frames of image data and audio data) to the client machines 112 for presentation on associated displays. In other implementations, the client machines 112 may be configured to download and execute video games locally, yet data may still be transmitted over the computer network 114 for purposes of engaging in an online multiplayer video game with other players. Furthermore, it is to be appreciated that the computer network 114 may be omitted in some scenarios, such as by functionality and components of the computing system 102 being implemented on a client machine 112. This is because, even in instances where a network is not involved (e.g., a single player 110 playing a video game on a local client machine 112), latency between player action and player perception may still arise due to other, non-network factors including, without limitation, a relatively low-performance client machine 112 executing a data-intensive video game with complex graphics. In this scenario, machine-learned prediction of user input can be utilized to compensate for such latency.

In some embodiments, the computing system 102 acts as, or has access to, a video game platform that implements a video game service to distribute (e.g., download, stream, etc.) video games (and content thereof) to the client machines 112. In an example, the client machines 112 may each install a client application thereon. The installed client application may be a video game client (e.g., gaming software to play video games). A client machine 112 with an installed client application may be configured to download, stream, or otherwise receive programs (e.g., video games, and content thereof) from the computing system 102 over the computer network 114. Any type of content-distribution model can be utilized for this purpose, such as a direct purchase model where programs (e.g., video games) are individually purchasable for download and execution on a client machine 112, a subscription-based model, a content-distribution model where programs are rented or leased for a period of time, streamed, or otherwise made available to the client machines 102. Accordingly, an individual client machine 112 may include one or more installed video games that are executable by loading the client application, or may access one or more video games executed at the remote computing system 102, which are playable by loading the client application.

The client machines 112 may be used to register with, and thereafter login to, a video game service. A user 110 may create a user account for this purpose and specify/set credentials (e.g., passwords, PINs, biometric IDs, etc.) tied to the registered user account. As a plurality of users 110 interact with the video game platform (e.g., by accessing their user/player profiles with a registered user account, playing video games on their respective client machines 112 using their respective game controllers 106, etc.), the client machines 112 send data to the remote computing system 102. The data sent to the remote computing system 102, for a given client machine 112, may include game control data 116 and sensor data 118, as well as other data including, without limitation, video game data (e.g., game performance statistics uploaded to the remote system), social networking messages and related activity, identifiers (IDs) of the video games played on the client machine 112, and so on. At least some of this data can be streamed in real-time (or substantially real-time) during a video game session, while a subset of the data may be sent the remote system 102 at defined intervals, and/or uploaded in response to events (e.g., exiting a video game).

As shown in FIG. 1, the game controller 106(A) may be used by the first player 110(A) to interact with the video game platform, as described herein. For example, the first player 110(A) may pair the game controller 106(A) with the client machine 112(A) that is executing a video game client (e.g., gaming software to play video games) thereon. Once the game controller 106(A) is paired with the client machine 112(A), and is able to communicate therewith (e.g., by sending/receiving data to/from the client machine 112(A)), the game controller 106(A) can be used to interact with the video game platform described herein, such as to register the game controller 106(A) with a user account, access video games available from the remote computing system 102, and play video games using the game controller 106(A).

A game controller 106, in some embodiments, may represent a handheld game controller, such as the game controllers 106(A) and 106(B) shown in FIG. 1, which are designed to be held by one or both hands of the player 110, and configured with one or more finger-operated controls to be operated by fingers and/or thumbs of the user's 110 hand(s). In some embodiments, the game controller 106 may further be configured to be operated by moving (e.g., panning, rotating, tilting, etc.) the game controller 106 in three-dimensional (3D) space. It is to be appreciated that the game controller 106 may represent any other suitable type of controller device, such as a mobile phone (e.g., a smart phone), a tablet computer, a portable digital assistant (PDA), a wearable computer (e.g., a smart watch, head-mounted display (HMD), etc.), a portable game player, and/or any similar electronic device. The term "handheld," as used herein to describe a game controller 106, means a device that is configured to be held by a user 110, regardless of whether the device is held by a hand(s) of the user 110, or by another portion of the user's 110 body (e.g., a wearable device worn on a wrist, arm, leg, waist, head, etc. is considered a "handheld" device, as the term is used herein).

One or more sensors of the game controller 106 is/are configured to generate the sensor data 118 that relates, in some manner, to the physical state of the game controller 106. For instance, a touch sensor(s) may generate sensor data 118 indicative of whether an object (e.g., a finger) is contacting, or near to, a portion of the game controller 106 (e.g., a directional pad (D-pad), a joystick, a trigger button, a bumper button, a selector button, etc.) that includes the touch sensor(s). A pressure senor(s), as another example, may generate sensor data 118 indicative of whether an object is pressing upon a portion of the game controller 106, and whether that portion of the game controller 106 is being pressed upon lightly or heavily by the object. A motion sensor (e.g., a gyroscope and/or accelerometer), as yet another example, may generate sensor data 118 indicative of whether the game controller 106 has changed in orientation and/or spatial location within a 3D space, and/or whether the game controller 106 is being moved rapidly or slowly. Thus, the sensor(s) of the game controller 106 are configured to generate sensor data 118 indicative of these, and other, kinds of physical states of the game controller 106.

As the first player 110(A) utilizes his/her game controller 106(A) to interact with the video game platform—e.g., to play a video game 120 on his/her respective client machine 112(A), the sensor data 118 and the game control data 116 may be sent from the game controller 106(A) to the client machine 112(A), and forwarded from the client machine 112(A) to the remote computing system 102. The game control data 116 is usable to control an aspect(s) of the video game 120, and is thereby processed by the video game 120 to determine how to render the next frame of the video game 120. Meanwhile, the sensor data 118 represents raw, unfiltered sensor data 118, such as raw data generated by a gyroscope, raw data generated by an accelerometer, and/or raw data generated by a touch sensor (e.g., a capacitive touch pad), or the like.

In a streaming implementation, a video game 120 may execute on the remote computing system 102, and the remote computing system 102 may capture video game data 122 and may send the video game data 122 over the network 114 to the client machines 112. This may involve the remote computing system 102 capturing the state of the video game 120, encoding the video and audio data into bits, transmitting the encoded bits to the client machine 112 over the computer network 114, and an application (e.g., a video game client) executing on the client machine 112 may decode the bits to output imagery via a display(s) and audio via a speaker(s) of (or via headphones connected to) the client machine 112 for a given frame. The players 110 may react to the video and audio he/she is seeing by operating their respective game controllers 106. For example, the player 110(A) may actuate a control (e.g., press a directional pad (D-pad), deflect a joystick, swipe a finger on a trackpad, press a button, etc.) of the game controller 106, and/or may tilt or move the game controller 106 in 3D space to control an aspect(s) of the video game 120. In response to operation of the game controller 106, the game controller 106 may generate game control data 116 that is sent to the remote computing system 102, either directly via a wireless access point and over the computer network 114, or via the client machine 112 with which the game controller 106 is associated. In either case, the game control data 116 can be sent to the remote computing system 102 in real-time for controlling an aspect(s) of the video game 120. For example, the game control data 116 can be processed by the video game 120 to control movement of a virtual object (e.g., a player-controlled character) of the video game 120 by causing the virtual object to move within a virtual world represented by a scene on a display of the client machine 112. In some embodiments, instances of a video game 120 may be executed locally on respective client machines 112(A) and 112(B), and the video game data 122 may include game control data 108 and/or 116 that is to be input to the video game 120 executing locally on a given client machine 112.

While the game control data 116 sent to the remote computing system 102 may include at least some sensor data 118 generated by a sensor(s) of the game controller 106, such as filtered/dampened sensor data 118 and/or amplified sensor data 118, the sensor data 118 that is sent by the game controller 106 to the remote computing system 102, as depicted in FIG. 1, represents raw, unfiltered sensor data 118 that is not used to control an aspect of the video game 120, but is used to generate a machine-learned score indicative of predicted user input to the game controller 106. As described herein, the machine-learned predictions of types of user input to game controllers 106 may be used to compensate for latency of the video game platform.

Accordingly, when the computing system 102 receives the game control data 116 and the sensor data 118 from a client machine 112, the computing system 102 may store that data, and possibly other data received from the client machine 112, in a datastore 124 accessible to the remote computing system 102. The data collected by the remote computing system 102 may be organized within the datastore 124 in any suitable manner to associate user accounts with relevant portions of the data, and/or to associate video games and/or past sessions of video games with relevant portions of the data. Over time, given a large community of players 110 that frequently interact with the video game platform, sometimes for long periods of time during a given session, a large amount of data can be collected and maintained in the datastore 124.

The computing system 102 may train a machine learning model(s) 104 using historical data sampled from the datastore 124. For example, the computing system 102 may access a portion of the historical data as sampled data, and use the sampled data to train the machine learning model(s) 104. In some embodiments, the portion of the data used as training data is represented by a set of features, and is labeled with a label that indicates one of multiple types of user input corresponding to historical game control data 116. In this manner, a supervised learning approach can be taken to train the machine learning model(s) 104 to predict certain types of user input that are likely to be provided to a player's game controller 106.

The machine learning model(s) 104 may be trained using historical sensor data 118 collected in the datastore 124. Additionally, or alternatively, the machine learning model(s) 104 may be trained using historical game state data 126 that includes game sates of a video game 120 that occurred during past sessions of the video game 120. Examples of game states of a video game 120 include, without limitation, player movement, positions in game maps, character classes, weapons, and the like. It is to be appreciated that the machine learning model(s) 104 may be trained using additional data, in addition to, or in lieu of, the aforementioned sensor data 118 and game state data 126. For example, historical game control data 116 may be collected from client machines 112 over time, the game control data 116 having been generated based on user input that was provided by human users to game controllers 106 in order to control an aspect(s) of the video game 120. These user inputs may include actuation of a control on the game controller 106, such as a press of a button, a deflection of a joystick, a swipe of a finger on a trackpad, etc., and/or a tilt or a movement of the game controller 106 in 3D space. Accordingly, historical game control data 116 (e.g., data indicative of user input provided to the game controller 106, such as to control an aspect(s) of a video game 120) may be used as training data, along with, or instead of using, the historical sensor data 118 and/or the historical game state data 126. Using the historical game control data 116 together with the historical sensor data 118 and/or the historical game state data 126 allows for correlations to be made between game control data 116 and sensor data 118 and/or game state data 126 generated at, or near, the same time as the game control data 116.

In general, training data can include two components: features and labels. However, the training data used to train the machine learning model(s) 104 may be unlabeled, in some embodiments. Accordingly, the machine learning model(s) 104 may be trainable using any suitable learning technique, such as supervised learning, unsupervised learning, semi-supervised learning, reinforcement learning, and so on. The features included in the training data can be represented by a set of features, such as in the form of an n-dimensional feature vector of quantifiable information about an attribute of the training data. Example features included in the training data may include, without limitation, sensor data 118 values (e.g., capacitance values, resistance values, displacement values, velocity values, acceleration values, temperature values, humidity values, etc.), game state data 126 values (e.g., values pertaining to player movement, positions in game maps, character classes, weapons, etc.), game control data 116 values (e.g., values generated by potentiometers and other switches of finger-operated controls), and/or any other suitable features that may be relevant in computing a score that is indicative of a probability that a certain type of user input will be provided to a game controller 106. In some embodiments, sensor data 118 values may relate to data generated by one or more physical sensors (e.g., biofeedback sensors) arranged on or in proximity to a player 110 to obtain biofeedback measures/values. Examples of such sensors and sensor data is described in U.S. Pat. No. 9,511,289, which is incorporated herein by reference in its entirety. The term "biofeedback," as used herein, refers to measures of a game player's specific and quantifiable bodily functions. Such biofeedback measures are typically referred to as measurements of unconscious or involuntary bodily functions. For example, sensor data 118 generated by such biofeedback sensors may generate values relating to blood pressure, blood oxygen levels, heart rate, respiration rate, galvanic skin responses, skin and/or body temperature of the player 110, sweat gland activity, eye movement, pupil dilations, head, face, hand, or other body movement, gestures, positions, facial expressions, postures, muscle tension, neuronal signals from the brain, and/or any other suitable non-verbal signal, value, and/or cue that provides an indication of a player's 110 emotions, feelings, wants, and/or desires. These types of values may be predictive of forthcoming user input to the game controller 106, and, hence, used as features to train a machine learning model(s) 104.

As part of the training of the machine learning model(s) 104, a training component may set weights for machine learning. These weights may apply to a set of features included in the training data, as derived from the historical data in the datastore 124, including the historical sensor data 118 and/or the historical game state data 126. In some embodiments, the weights that are set during the training process may apply to parameters that are internal to the machine learning model(s) 104 (e.g., weights for neurons in a hidden-layer of a neural network). These internal parameters of the machine learning model(s) may or may not map one-to-one with individual input features of the set of features. The weights can indicate the influence that any given feature or parameter has on the score that is output by the trained machine learning model(s) 104.

Using the trained machine learning model(s) 104, the computing system 102 may score different types of user input that can be provided to a game controller 106. For example, the computing system 102 may receive new sensor data 118 associated with one or more logged-in, registered user accounts from one or more client machines 112, and/or the computing system 102 may receive new game state data 126 from an executing video game 120. In an illustrative example, a video game 120 may be executing on a client machine(s) 112(A)/(B) via the installed client application, or the video game 130 may be streamed to the client machine(s) 112(A)/(B) while it is executing on the remote computing system 102. In any case, as players 110 login with their user accounts and execute a particular video game 120, requesting to play in multiplayer mode, for example, their respective client machines 112 may provide information to the computing system 102 indicating as much, and sensor data 118 and game control data 116 may be streamed, in real-time, to the remote computing system 102 from the client machine(s) 112(A)/(B) as the video game 120 is initiated and the players 110 begin gameplay.

In an example, the computing system 102 may provide the new sensor data 118 it receives from a first client machine 112(A) as input to the trained machine learning model(s) 104, and may generate, as output from the trained machine learning model(s) 104, a score 128 associated with a predicted type of user input. The score 128, in the example of FIG. 1, relates to the probability that the first player 110(A) will actuate the "A" button of the game controller 106(A)—actuation of the "A" button being a particular type of user input to the game controller 106(A)—to cause corresponding game control data 116 to be received from a first client machine 112(A) within a time period since the receiving of the new sensor data 118. In this case, a high score 128 indicates a high likelihood that the player 110(A) will provide the particular type of user input, whereas a low score 128 indicates a low likelihood that the player 110(A) will provide the particular type of user input. In some embodiments, the score 128 is a variable that is normalized in the range of [0,1]. This score 128 may have a monotonic relationship with a probability of the particular type of user input being provided to the game controller 106. The relationship between the score 128 and the actual probability, while monotonic, may or may not be a linear relationship. Of course, the scoring can be implemented in any suitable manner to predict a probability that the type of user input will be provided to the game controller 106.

While the example of FIG. 1 illustrates a trained machine learning model(s) 104 that resides and executes on the remote computing system 102, it is to be appreciated that the trained machine learning model(s) 104 may be provided to one or more of the client machines 112 that are collocated with the players 110 of the video game 120. That is, although training may occur at the remote computing system 102, the trained machine learning model(s) 104 may be downloaded to client machines 112 for execution of the trained machine learning model(s) 104 on the client machines 112 themselves (either in lieu of, or in addition to, executing a trained machine learning model(s) 104 on the remote computing system 102). In these embodiments, the client machines 112 may utilize a common machine learning model(s) 104, and/or multiple client machines 112 may each utilize different machine learning models 104. For example, the first client machine 112(A) may execute a first trained machine learning model(s) 104, and the second client machine 112 (B) may execute a second trained machine learning model(s) 104 that is different from the first trained machine learning model 104, and so on for any number of client machines 112. In an illustrative example, different user-specific machine learning models 104 can be trained on historical data that is specific to respective users 110, and these respective user-specific machine learning models 104 can be downloaded to the respective client machines 112 of those users 110, instead of, or in addition to, training a machine learning model(s) 104 on aggregate data gathered from an entire player 110 population. It is to be appreciated that such user-specific machine learning model(s) 104 may also be executed on the remote computing system 102 and utilized on a per-player 110 basis for predicting user input associated with particular players 110. Accordingly, any reference made herein to a "computing system 102" that provides input data to a trained machine learning model(s) 104 for predicting user input may be replaced with "client machine 112". In this manner, the trained machine learning model(s) 104 can execute on a client machine 112. Therefore, the terminology "computing system 102" and "client machine 112" may be used interchangeably herein in this context.

In some embodiments, new game state data 126 may be provided as additional input, or as alternative input, to the trained machine learning model(s) 104 to generate the score 128. In this scenario, the score 128 (as illustrated in FIG. 1) may relate to the probability that the first player 110(A) will actuate the "A" button of the game controller 106(A) to cause corresponding game control data 116 to be received from a first client machine 112(A) within a time period since the receiving of the new game state data 126. The time period (or time in the future when the user input is predicted to occur) may vary, and the trained machine learning model(s) 104 may be trained to predict user input that will be provided at any suitable time after receiving the input data. For example, the machine learning model(s) 104 may be trained to predict user input that will be provided 1 millisecond after the sensor data 118 and/or game state data 126 is received, 200 milliseconds after the sensor data 118 and/or game state data 126 is received, or any other suitable time period. Although a single score 128 is shown in FIG. 1, it is to be appreciated that the machine learning model(s) 104 may be configured to output multiple scores 128 for multiple different types of user input (e.g., selection of the "B" button, "X" button, "Y" button, deflection of the joystick, rotation of the game controller 106, etc.).

In some embodiments, the new game control data 116 itself may be provided as additional input, or as alternative input, to the trained machine learning model(s) 104 to generate the score 128. For example, a player 110 may operate the game controller 106 during gameplay by actuating a control (e.g., pressing a button, such as a directional pad (D-pad), deflecting a joystick, swiping a finger on a trackpad, etc.) of the game controller 106, and/or by tilting or moving the game controller 106 in 3D space to control an aspect(s) of the video game 120. In response to the user's operation of the game controller 106, the game controller 106 may generate game control data 116. This new game control data 116—which is indicative of the user input provided to the game controller 106—may be provided as input to the trained machine learning model(s) 104. If the trained machine learning model(s) 104 is executing on the remote computing system 102, the game control data 116 may be sent to the remote computing system 102 for this purpose.

Based at least in part on the machine-learned score(s) 128 determined for a type(s) of user input, the computing system 102 may generate game control data 108 that corresponds to the type of user input, provide the game control data 108 to the video game 120 as input, receive video game data 122 as output from the video game. If the video game data 122 is generated at the remote system 102, the remote system 102 may send the video game data 122 to a client machine 112(B) over the computer network 114. If the video game 120 is executing on the client machine 112(B), the remote system 102 may send the game control data 108 to the client machine 112(B) over the computer network 114, and the client machine 112(B) may generate the video game data 122. If the trained machine learning model(s) 104 is executing on the client machine 112(B), the remote system 102 may send at least the sensor data 118 to the client machine 112(B) over the computer network 114, and the client machine 112(B) may provide the sensor data 118 and/or the game state data 126 as input the trained machine learning model(s) 104. If the video game 120 and the trained machine learning model(s) 104 are executing on the client machine 112(A), the video game data 122 may not be sent to any other computing device, but may be presented on a display of the client machine 112(A). In any case, a player 110, such as the second player 110(B), can perceive video game content that exhibits something related to player action(s) (e.g., an action(s) of the first player 110(A)) very close in time to a time when the player 110 (e.g., the first player 110(A)) provided the user input to the game controller 106(A) (i.e., without a noticeable delay that may degrade play quality of the video game 120). For instance, when the first player 110(A) selects the "A" button of the game controller 106(A), the second player 110(B) perceives a video game character 130 being controlled by the first player 110(A) as jumping in close synchronization with the actuation of the "A" button by the first player 110(A). This compensates for latency of the video game platform and is due to the machine-learned prediction of the first player 110(A) selecting the "A" button, which is predicted in advance of the first player 110(A) actually selecting the "A" button.

Figure 2:
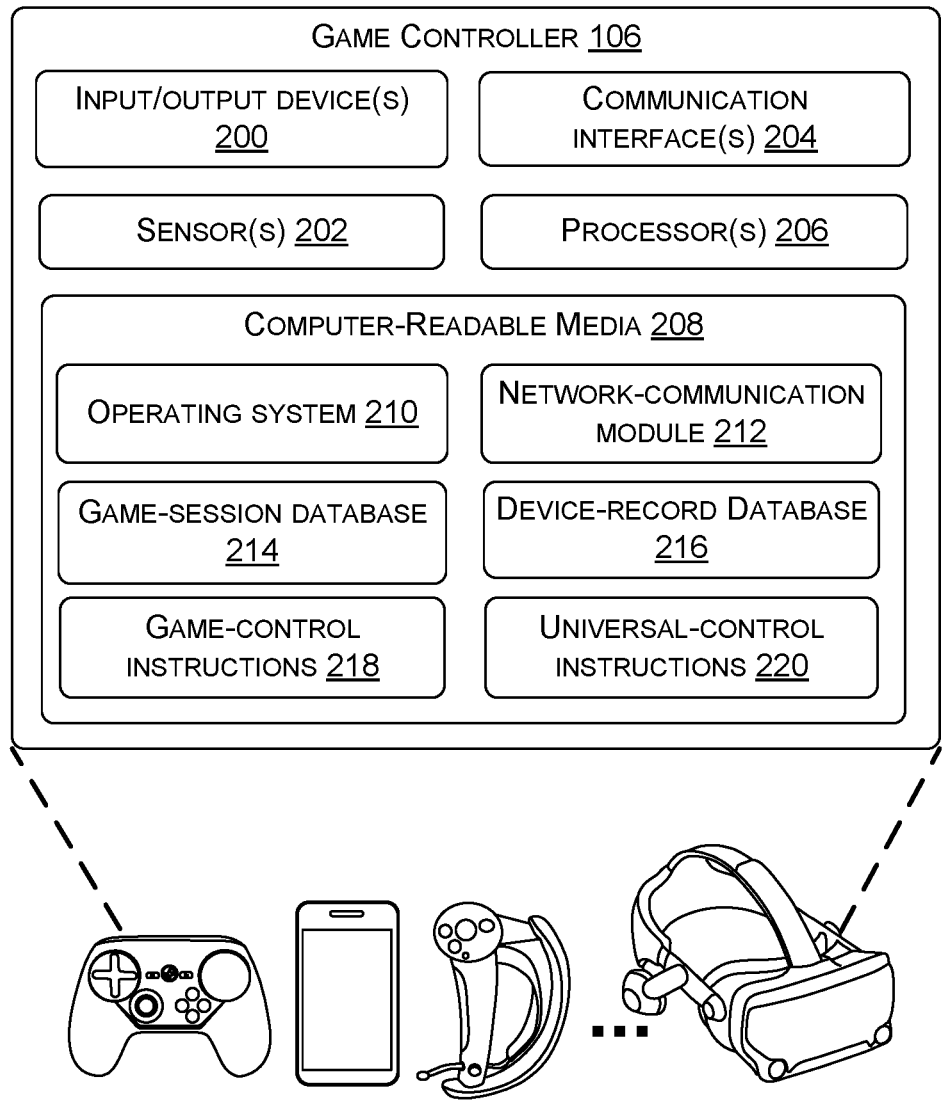
FIG. 2 shows a block diagram illustrating example components of a game controller that is configured to provide sensor data, among other data, to a remote computing system for purposes of predicting user input to the game controller using a trained machine learning model(s).

FIG. 2 shows a block diagram illustrating example components of a game controller 106 that is configured to provide sensor data 118, among other data, to a remote computing system 102 for purposes of predicting user input to the game controller 106 using a trained machine learning model(s) 104. The game controller 106 of FIG. 2 may be used by a player 110 to interact with the video game platform, as described herein. For example, a player 110 may pair the game controller 106 with a client machine 112 that is executing a video game client (e.g., gaming software to play video games) thereon. Once the game controller 106 is paired with the client machine 112, the game controller 106 and is able to communicate therewith (e.g., by sending/ receiving data to/from the client machine 112), the game controller 106 can be used to interact with the video game platform described herein, such as to register the game controller 106 with a user account, access video games available from the remote computing system 102, and play video games using the game controller 106.

The game controller 106 may represent a handheld game controller, such as a game controller depicted in FIG. 1, which is designed to be held by one or both hands of the player 110, and configured with one or more finger-operated controls to be operated by fingers and/or thumbs of the player's 110 hand(s). In some embodiments, the game controller 106 may further be configured to be operated by moving (e.g., panning, rotating, tilting, etc.) the game controller 106 in three-dimensional (3D) space. It is to be appreciated that the game controller 106 may represent any other suitable type of handheld device, wearable device, or the like, such as a mobile phone (e.g., a smart phone), a tablet computer, a portable digital assistant (PDA), a wearable computer (e.g., a smart watch, a HMD, etc.), a portable game player, and/or any similar electronic device.

As shown in FIG. 2, the game controller 106 includes one or more input/output (I/O) devices 200, such as finger-operated controls (e.g., joysticks, trackpads, triggers, depressible buttons, etc.), potentially other types of input or output devices, such as a touchscreen(s), a microphone(s) to receive audio input, such as user voice input, a camera(s) or other types of sensor (e.g., sensor(s) 202) that can function as an input device to receive gestural input, such as motion of the game controller 106 and/or a hand of the user 110. In some embodiments, additional input devices may be provided in the form of a keyboard, keypad, mouse, touch screen, joystick, control buttons and the like. The input device(s) may further include control mechanisms, such as basic volume control button(s) for increasing/decreasing volume, as well as power and reset buttons. The input device(s) can facilitate the input of biometric data of a user 110, such as obtaining a fingerprint or palmprint, scanning a user's eye and/or face, capturing a user's voice, and the like, for biometric recognition/authentication of the user 110.

The output devices, meanwhile, may include a display, a light element (e.g., LED), a vibrator to create haptic sensations, a speaker(s) (e.g., headphones), and/or the like. There may also be a simple light element (e.g., LED) to indicate a state such as, for example, when power is on. While a few examples have been provided, the game controller 106 may additionally or alternatively comprise any other type of output device. In some instances, output by the one or more output devices may be based on input received by one or more of the input devices. For example, actuation of a control may result in the output of a haptic response by a vibrator located adjacent (e.g., underneath) the control or at any other location.

In addition, the game controller 106 may include one or more communication interfaces 204 to facilitate a wireless connection to a network and/or to one or more remote systems (e.g., a client machine 112 executing an application, a game console, a wireless access point, etc.). The communication interfaces 204 may implement one or more of various wireless technologies, such as Wi-Fi, Bluetooth, radio frequency (RF), and so on. It is to be appreciated that the game controller 106 may further include physical ports to facilitate a wired connection to a network, a connected peripheral device, or a plug-in network device that communicates with other wireless networks.

In the illustrated implementation, the game controller 106 further includes one or more processors 206 and computer-readable media 208. In some implementations, the processors(s) 206 may include a central processing unit (CPU), a graphics processing unit (GPU), both CPU and GPU, a microprocessor, a digital signal processor or other processing units or components known in the art. Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 206 may possess its own local memory, which also may store program modules, program data, and/or one or more operating systems.

The computer-readable media 208 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 208 may be implemented as computer-readable storage media ("CRSM"), which may be any available physical media accessible by the processor(s) 206 to execute instructions stored on the computer-readable media 208. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 206.

Several modules such as instruction, datastores, and so forth may be stored within the computer-readable media 208 and configured to execute on the processor(s) 206. A few example functional modules are shown as stored in the computer-readable media 208 and executed on the processor(s) 206, although the same functionality may alternatively be implemented in hardware, firmware, or as a system on a chip (SOC).

An operating system module 210 may be configured to manage hardware within and coupled to the game controller 106 for the benefit of other modules. In addition, the computer-readable media 208 may store a network-communications module 212 that enables the game controller 106 to communicate, via the communication interface(s) 204, with one or more other devices, such as a client machine 112 (e.g., a PC) executing an application (e.g., a game application), a game console, a remote computing system 102, or the like. The computer-readable media 208 may further include a game-session database 214 to store data associated with a game (or other application) executing on the game controller 106, on the client machine 112 connected to the game controller 106, or on the remote computing system 102 connected to the game controller 106 and/or the client machine 112. The computer-readable media 208 may also include a device-record database 216 that stores data associated with devices to which the game controller 106 couples, such as the client machine 112 (e.g., a PC, a game console, etc.), the remote computing system 102, and the like. The computer-readable media 208 may further store game-control instructions 218 that configure the game controller 106 to function as a gaming controller, and universal-control instructions 220 that configure the game controller 106 to function as a controller of other, non-gaming devices.

The game controller 106 is also shown as including one or more sensors 202. For example, the sensor(s) 202 may include a motion sensor(s), such as an inertial measurement unit(s) (IMU(s)), which may include one or more gyroscopes, and/or accelerometers, and/or magnetometers, and/or compasses, or any other suitable motion sensor. In some embodiments, the sensor(s) 202 may be implemented as a standalone gyroscope(s), accelerometer(s), magnetometer(s), compass(es), etc., and not necessarily implemented as an IMU(s). In some embodiments, one or more of these sensors 202 may be utilized for providing six-component motion sensing. For instance, an IMU may be configured to sense and generate the sensor data 118 that is indicative of translational and/or rotational movement about a 3D space. The sensor data 118 generated by such a sensor(s) 202 may relate to the extent, rate, and/or acceleration of translational movement in 3D space (X, Y, and Z movement), as well as the extent, rate, and/or acceleration of rotational movement in 3D space (roll, pitch, and yaw). Measurements may be generated in terms of a 3D coordinate system, such as Cartesian (X, Y, and Z) or spherical coordinate systems. The sensor data 118 may include, for example, measurements in terms of displacement (e.g., displacement since the preceding time log), velocity, and/or acceleration of translational movement (denoted by variables: d, v, a) and angular movement (denoted by variables: $\theta$, $\omega$, $\alpha$). The sensor data 118 may further include times at which the sensor data 118 is generated and/or transmitted, e.g., at any suitable time interval, so that a history of sensor data 118 can be collected and temporarily, or permanently, stored on the game controller 106.

As another example, the sensor(s) 202 may include a touch sensor(s) configured to sense proximity of an object, such as a finger, palm, etc., to the touch sensor(s), which may be based on any suitable touch-sensing technologies, such as a capacitive touch sensor, a resistive touch sensor, an infrared touch sensor, a touch sensor that utilizes acoustic soundwaves to detect a proximity of a finger, or any other type of touch sensor. For example, a touch sensor(s) may be disposed underneath or on a surface of the device, and/or within or on a finger-operated control, in order to detect proximity of a finger(s) to the surface or to the finger-operated control. In response to detecting the proximity (e.g., the finger contacting or hovering above the surface), the touch sensor(s) may generate sensor data 118 indicative of the proximity of the finger(s). Such as touch sensor(s) may be embedded in a handle(s) of the game controller 106 to detect a user's 110 grip, and/or within various controls, including trackpads, joysticks, buttons, etc. In implementations that utilize capacitive-based sensing, the touch sensor(s) may include electrodes (e.g., a transmitter electrode and a receiver electrode of a transcapacitive-type sensor), and voltage can be applied to the electrodes so that the electrodes are configured to measure capacitance changes at the electrodes, which can be translated into sensor data 118 in the form of capacitance values that are indicative of proximity of an object to the sensor(s) 202. For example, capacitance changes at the electrodes of a capacitive-based touch sensor(s) may be influenced by an object (such as the finger) that is in proximity to the electrodes. The raw capacitance can be digitized into proximity values to generate the sensor data 118.

As another example, the sensor(s) 202 may include a pressure sensor(s), such as a force sensing resistor(s) (FSR(s)). For example, a FSR may include a conductive material spaced apart from a resistive membrane (e.g., a semiconductive material, such as an ink composition), as well as an actuator that is configured to convey a force onto the resistive membrane so that the resistive material contacts the conductive material under the application of a compressive force applied to the actuator. A FSR may exhibit varying resistance in response to variable forces to generate sensor data 118 corresponding to the resistance values. A FSR can be a "ShuntMode" FSR or a "ThruMode" FSR. With a ShuntMode FSR, the conductive material spaced from the resistive membrane may be a plurality of interdigitated metal fingers. When a force is applied to the actuator of the FSR, the resistive membrane contacts some of the interdigitated metal fingers, which shunts the metal fingers, thereby varying the resistance across the output terminals of the FSR, which can be digitized into a FSR value to generate the sensor data 118. In some embodiments, a pressure sensor(s) may additionally, or alternatively, include other types of pressure sensing mechanisms, such as piezoelectric sensors, strain gauges, and the like.

Other examples of sensors 202 configured to generate corresponding sensor data 118 may include, without limitation, a temperature sensor(s), a humidity sensor(s), a camera(s) (including infrared (IR), or other non-visible spectrum cameras), eye tracking system, weight/position sensor pads upon which the player 110 might stand upon, other biofeedback sensors—such as those described in U.S. Pat. No. 9,511,289, including heartrate sensors, galvanic skin response sensors, eye-tracking sensors, facial expression sensors, muscle tension sensors, posture sensors, and the like. As yet another example, the sensor(s) 202 may include sensor(s) 202 that detect signals indicative of neuronal activity, such an electroencephalography (EEG) sensor, a quantitative EEG (qEEG) sensor, a functional near-infrared spectroscopy (fNIRS) sensor, a functional magnetic resonance imaging (fMRI) sensor, an electromyography (EMG) sensor, an electrooculography (EOG) sensor, and/or other brain-computer interface sensors. A game controller 106 (e.g., a HMD) that is configured to be worn on a head of the player 110 is a natural facilitator of these types of brain-computer interface sensors because it is already in contact with the head of the user. While the sensor(s) 202 are depicted as being embedded in (e.g., integrated in the game controller 106, one or more finger-operated controls thereof, etc.) or on (attached to a surface of the game controller 106 body, a finger-operated control thereof, etc.) the game controller 106, in some embodiments, a sensor(s) 202 may be external to the game controller 106 and connected as a peripheral thereto, or a sensor(s) 202 may be external to the game controller 106 and communicatively coupled to a client machine 112 such that the sensor(s) 202 is/are usable as a standalone sensor(s) 202. For example, a sensor(s) 202 may be arranged on (e.g., attached to) or in proximity to a player 110 to obtain biofeedback measures about the player 110, which may be input to a trained machine learning model(s) 104.

Regardless of the type of sensor(s) 202 of the game controller 106, the sensor(s) 202 is/are configured to generate sensor data 118 that relates, in some manner, to the physical state of the game controller 106. For instance, a touch sensor(s) may generate sensor data 118 indicative of whether an object (e.g., a finger) is contacting, or near to, a portion of the game controller 106 (e.g., a directional pad (D-pad), a joystick, a trigger button, a bumper button, a selector button, etc.) that includes the touch sensor(s). A pressure senor(s), as another example, may generate sensor data 118 indicative of whether an object is pressing upon a portion of the game controller 106, and whether that portion of the game controller 106 is being pressed upon lightly or heavily by the object. A motion sensor (e.g., a gyroscope and/or accelerometer), as yet another example, may generate sensor data 118 indicative of whether the game controller 106 has changed in orientation and/or spatial location within a 3D space, and/or whether the game controller 106 is being moved rapidly or slowly. Thus, the sensor(s) 202 of the game controller 106 are configured to generate sensor data 118 indicative of these, and other, kinds of physical states of the game controller 106.

Accordingly, as a player 110 utilizes the game controller 106 to interact with the video game platform—e.g., to play a video game 120 on a client machine 112, the sensor data 118 and the game control data 116 introduced in FIG. 1 may be sent to the client machine 112 and forwarded from the client machine 112 to the remote computing system 102. The game control data 116 is usable to control an aspect(s) of the video game 120, and is thereby processed by the video game 120 to determine how to render the next frame of the video game 120. The sensor data 118 represents raw, unfiltered sensor data 118, such as raw data generated by a gyroscope, raw data generated by an accelerometer, and/or raw data generated by a touch sensor (e.g., a capacitive touch pad).

Figure 3:
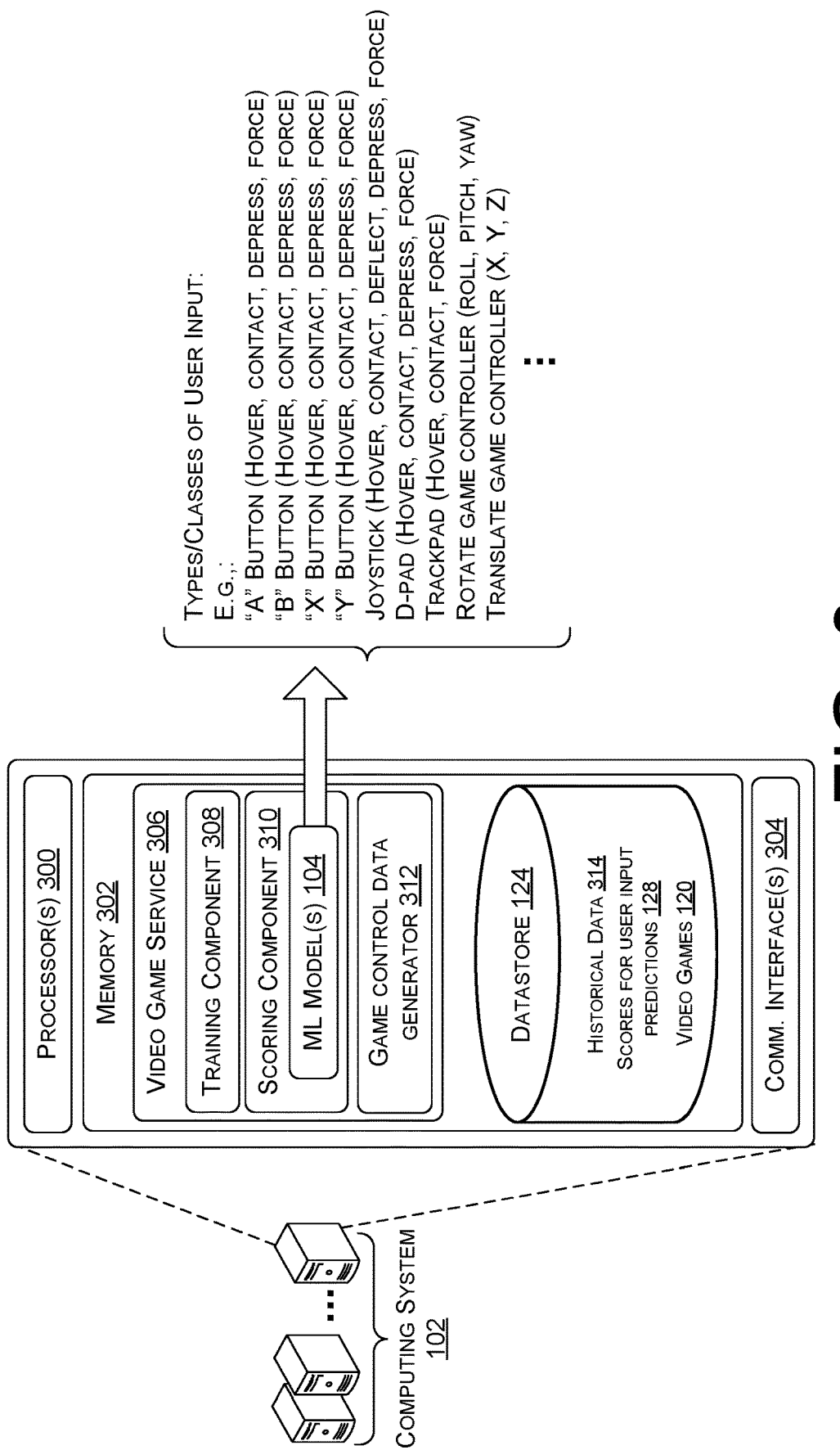
FIG. 3 shows a block diagram illustrating example components of a computing system configured to predict user input to a game controller using a trained machine learning model(s).

FIG. 3 shows a block diagram illustrating example components of a computing system 102 configured to predict user input to a game controller 106 using a trained machine learning model(s) 104. In the illustrated implementation, the computing system 102 includes, among other components, one or more processors 300 (e.g., a CPU(s)), memory 302 (or non-transitory computer-readable media 302), and a communications interface(s) 304. The memory 302 (or non-transitory computer-readable media 302) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 302 may be implemented as computer-readable storage media ("CRSM"), which may be any available physical media accessible by the processor(s) 300 to execute instructions stored on the memory 302. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 300. A video game service 306 may represent instructions stored in the memory 302 that, when executed by the processor(s) 300, cause the computing system 102 to perform the techniques and operations described herein.

For example, the video game service 306 may include a training component 308, a scoring component 310, and a game control data generator 312, among other possible components. The training component 308 may be configured to train a machine learning model(s) using a portion of data 314 (sometimes referred to herein as "historical data" 314) in the datastore 124 as training data to obtain a trained machine learning model(s) 104. The trained machine learning model(s) 104 is usable by the scoring component 310 to determine scores 128 relating to predicted user input to a game controller 106. The game control data generator 312 generates game control data 108 that corresponds to a type of user input based at least in part on the machine-learned score 128 generated for that type of user input. The game control data generator 312 may be further configured to provide the game control data 108 it generates as input to the executing video game 120, receive video game data 122 as output from the video game 120 based at least in part on the game control data 108. As mentioned, the trained machine learning model(s) 104 may reside and execute on one or more client machines 112, in some embodiments. Accordingly, it is to be appreciated that at least the scoring component 310, the trained machine learning model(s) 104, and/or the game control data generator 312 may be executed on a client machine(s) 112, in lieu of, or in addition to, being executed on the remote computing system 102, as shown in FIG. 3. In some embodiments, the computing system 102 may represent a client machine 112 that is local to a player 110 playing the video game 120. In embodiments where the computing system 102 represents a remote computing system 102 with the components shown in FIG. 3, the computing system 102 may send, via the communications interface(s) 304 and over a computer network 114, the video game data 122 (or the game control data 108, or the data that is to be input to a local machine learning model(s) 104, such as the sensor data 118) to a client machine(s) 112 associated with a player 110 of the video game 120. Predicting user input to a game controller 106 and proactively generating game control data 108 in this manner allows for mitigating the effects of, or compensating for, latency of the video game platform. By way of example, the trained machine learning model(s) 104 may process sensor data 118 received from a first client machine 112(A) as input, and may generate a score 128 as output, the score 128 relating to a probability that a type of user input will be provided to a first game controller 106(A) of a first player 110(A) who is associated with the first client machine 112(A)—e.g., that the "A" button of the controller will be actuated.

As mentioned, the scores 128 determined by the scoring component 310 (e.g., output by the trained machine learning model(s) 104) are machine-learned scores 128. Machine learning generally involves processing a set of examples (called "training data") in order to train a machine learning model(s). A machine learning model(s) 104, once trained, is a learned mechanism that can receive new data as input and estimate or predict a result as output. For example, a trained machine learning model 104 can comprise a classifier that is tasked with classifying unknown input (e.g., an unknown image) as one of multiple class labels (e.g., labeling the image as a cat or a dog). In some cases, a trained machine learning model 104 is configured to implement a multi-label classification task (e.g., labeling images as "cat," "dog," "duck," "penguin," and so on). Additionally, or alternatively, a trained machine learning model 104 can be trained to infer a probability, or a set of probabilities, for a classification task based on unknown data received as input. In the context of the present disclosure, the unknown input may be sensor data 118 (e.g., raw sensor data) that is generated by a sensor(s) 202 of a game controller 106 utilized by player 110 while playing a video game 120, and the trained machine learning model(s) 104 may be tasked with outputting a score 128 that indicates, or otherwise relates to, a probability that one of multiple classes, or types, of user input will be provided to the game controller 106 to cause corresponding game control data 116 to be received from a client machine 112 within a time period since receiving the sensor data 118. In some embodiments, the unknown input may be game state data 126 that includes a game state (e.g., player movement, character position on a game map, a character class, a weapon, etc.) of an executing video game 120, and the trained machine learning model(s) 104 may be tasked with outputting a score 128 that indicates, or otherwise relates to, a probability that one of multiple classes, or types, of user input will be provided to the game controller 106 to cause corresponding game control data 116 to be received from a client machine 112 within a time period since receiving the game state data 126. In some embodiments, the score 128 is a variable that is normalized in the range of [0,1]. This score 128 may have a monotonic relationship with a probability that a certain type of user input will be provided to the game controller 106. The relationship between the score 128 and the actual probability associated with the particular type of user input, while monotonic, may or may not be a linear relationship. In some embodiments, the trained machine learning model(s) 104 may output a set of probabilities (e.g., two probabilities), or scores relating thereto, where one probability (or score) relates to the probability that the type of user input will be provided to the game controller 106, and the other probability (or score) relates to the probability that the type of user input will not be provided to the game controller. The score 128 that is output by the trained machine learning model(s) 104 can relate to either of these probabilities in order to influence the type of game control data 108 that is generated proactively (i.e., before upcoming game control data 116 based on actual user input to the game controller 106 is received).

The trained machine learning model(s) 104 may represent a single model or an ensemble of base-level machine learning models, and may be implemented as any type of machine learning model 104. For example, suitable machine learning models 104 for use with the techniques and systems described herein include, without limitation, neural networks, tree-based models, support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of machine learning models 104 whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

The training data that is used to train the machine learning model(s) 104 may include various types of data 314. In general, and as mentioned previously, training data for machine learning can include two components: features and labels. However, the training data used to train the machine learning model(s) 104 may be unlabeled, in some embodiments. Accordingly, the machine learning model(s) 104 may be trainable using any suitable learning technique, such as supervised learning, unsupervised learning, semi-supervised learning, reinforcement learning, and so on. The features included in the training data can be represented by a set of features, such as in the form of an n-dimensional feature vector of quantifiable information about an attribute of the training data. The following is a list of example features that can be included in the training data for training the machine learning model(s) 216 described herein. However, it is to be appreciated that the following list of features is non-exhaustive, and features used in training may include additional features not described herein, and, in some cases, some, but not all, of the features listed herein. Example features included in the training data may include, without limitation, sensor data 118 values (e.g., capacitance values, resistance values, displacement values, velocity values, acceleration values, temperature values, humidity values, biofeedback values—such as those described in U.S. Pat. No. 9,511,289, etc.), game state data 126 values (e.g., values pertaining to player movement, positions in game maps, character classes, weapons, etc.), game control data 116 values (e.g., values generated by potentiometers and other switches of finger-operated controls), and/or any other suitable features that may be relevant in computing a score that is indicative of a probability a certain type of user input will be provided to a game controller 106. As part of the training process, the training component 308 may set weights for machine learning. These weights may apply to a set of features included in the training data, as derived from the historical data 314 in the datastore 124. In some embodiments, the weights that are set during the training process may apply to parameters that are internal to the machine learning model(s) (e.g., weights for neurons in a hidden-layer of a neural network). These internal parameters of the machine learning model(s) may or may not map one-to-one with individual input features of the set of features. The weights can indicate the influence that any given feature or parameter has on the score 128 that is output by the trained machine learning model 104.

FIG. 3 illustrates examples of types, or classes, of user input that can be scored by the trained machine learning model(s) 104 as a means of predicting forthcoming user input to a game controller 106. For example, with respect to any finger-operated control of the game controller 106 (e.g., an "A" button, a "B" button, an "X" button, a "Y" button, a joystick, a D-pad, a track pad, a bumper button, a trigger button, etc.), various types of user input can be scored, such as a finger hovering over the control without contacting the control, a finger contacting the control without pressing upon the control with an above-threshold amount of force, or a finger pressing upon the control with an above-threshold amount of force. If the finger-operated control is a mechanically-actuating control (e.g., a button, a joystick, a D-pad, etc.), an additional type of user input that can be scored is a depression and/or a deflection of the finger-operated control. Another type of user input that can be scored is rotation of the game controller 106 in 3D space (e.g., roll, pitch, yaw). Yet another type of user input that can be scored is translational movement of the game controller 106 in 3D space (e.g., translational movement in X, Y, and/or Z directions). It is to be appreciated that these examples are non-exhaustive, and that other examples of types of user input can be scored, as would be recognized by a person of ordinary skill in the art. In any case, the game control data generator 312 may generate game control data 108 corresponding to a type of user input assigned a score that satisfies (e.g., exceeds, meets or exceeds) a threshold score associated with the type of user input. Different types of user input may be associated with different threshold scores for this purpose. For example, if the system wants to be more confident in its prediction that a player 110 will rotate the game controller 106 before generating corresponding game control data 108, a relatively high threshold score may be used as a confidence level to reduce false positive rates with predictions of that particular type of user input. By contrast, if being wrong in predicting that the player 110 will select the "X" button is unlikely to degrade play quality (e.g., if selection of the "X" button is not a performance-critical action in the video game 120), then a relatively low threshold score may be used as a confidence level to generate game control data 108 for that particular type of user input with reasonable confidence that the prediction was accurate. Ways of handling incorrect predictions may include replacing incorrectly-predicted game state with known correct game state (once that state becomes known), in some cases with additional logic to make this replacement less noticeable/distracting to the affected player(s) (e.g., gradually interpolating a virtual object from an incorrect location to the correct location, instead of instantly teleporting it to the correct location).

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
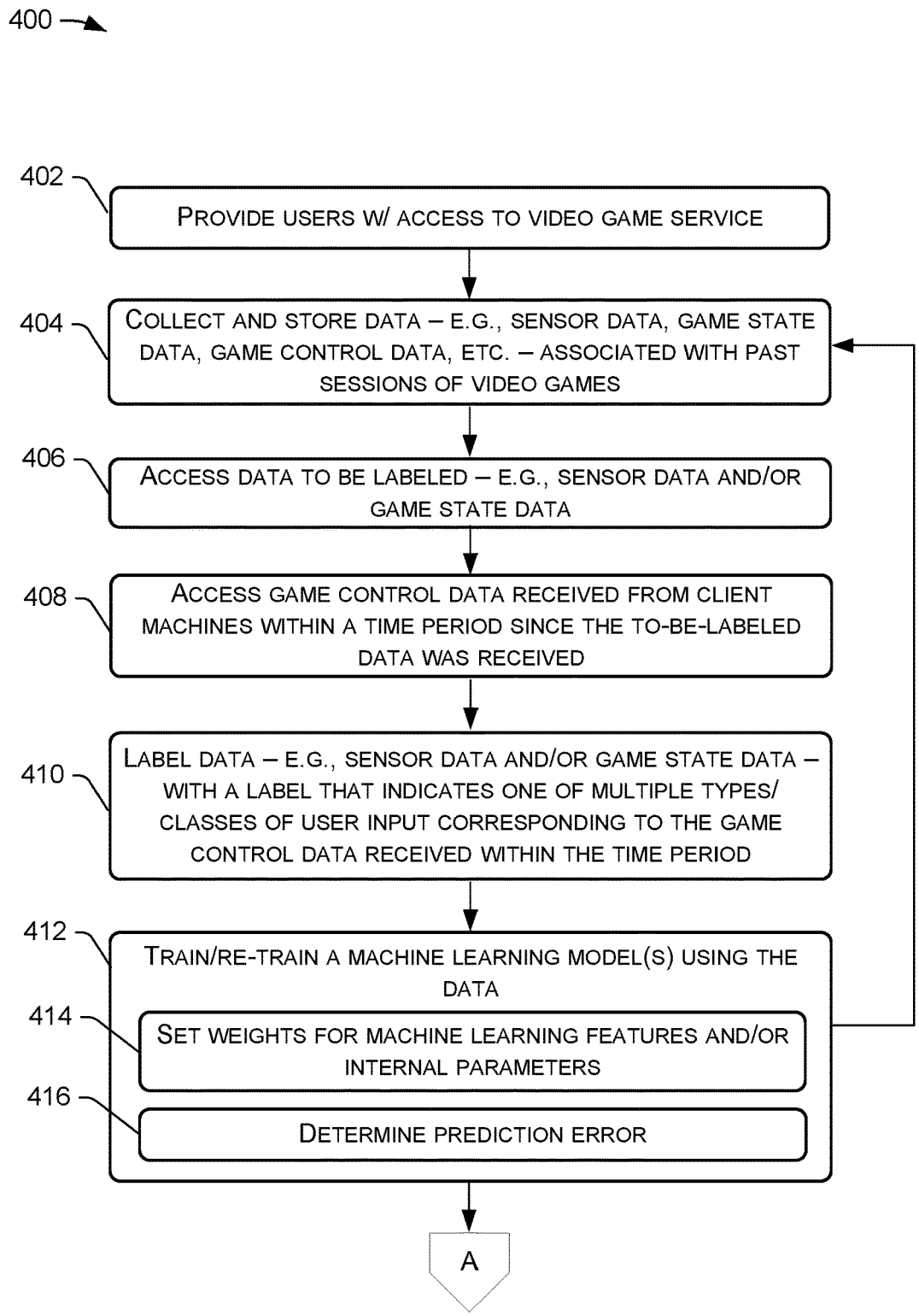
FIG. 4 is a flow diagram of an example process for training a machine learning model(s) to predict a probability that a type of user input will be provided to a player's game controller.

FIG. 4 is a flow diagram of an example process 400 for training a machine learning model(s) 104 to predict a probability that a type of user input will be provided to a player's game controller. For discussion purposes, the process 400 is described with reference to the previous figures.

At 402, a computing system 102 may provide users 110 with access to a video game service. For example, the computing system 102 may allow users to access and browse a catalogue of video games, modify user profiles, conduct transactions, engage in social media activity, and other similar actions. The computing system 102 may distribute video games (and content thereof) to client machines 112 as part of the video game service. In an illustrative example, a user 110 with access to the video game service can load an installed client application, login with a registered user account, select a desired video game 120, and execute the video game 120 on his/her client machine 112 or stream the video game 120 via the client application.

At 404, the computing system 102 may collect and store data 314 associated with past sessions of video games. This data 314 may be collected at block 404 whenever users 110 access the video game service with their registered user accounts and use this video game platform, such as to play video games 120 thereon. The data 314 collected at block 404 may include, without limitation, sensor data 118 and game control data 116 received from client machines 112 and generated by game controllers 106, game state data 126 of the video games, and the like. Over time, one can appreciate that a large collection of data 314 tied to registered user accounts may be available to the computing system 106. It is to be appreciated that an entity providing the video game service may request that users 110 provide informed consent to having their data collected and used for training machine learning models for purposes of reducing latency between player action and player perception in their video games 120.

At 406, the computing system 102, via the training component 308, may access (historical) data 314 associated with past sessions of video games 120 played via the video game service that is to be labeled for supervised machine learning. For example, the (historical) data 314 accessed at 406 may include historical sensor data 118 received from client machines 112 during past sessions of a particular video game(s) 120. Additionally, or alternatively, the (historical) data 314 accessed at 406 may include historical game state data 126 that includes a game state of the video game 120 that occurred during past sessions of the video game 120.

At 408, the computing system 102, via the training component 308, may access (historical) game control data 116 received from client machines 112 within a time period since (i) the historical sensor data 118 was received from those client machines 112, or (ii) the game state (included in the historical game state data 126) occurred during the past sessions of the video games played via the video game service. This time period may be any suitable time period, such as a time period within a range of about 1 millisecond to about 200 milliseconds, depending on how far in the future the user input prediction is to be made. In an illustrative example, it may be the case that a particular player 110 who is about to depress the "A" button of the game controller 106 often twists the game controller 106 to the right by a small amount just before he/she depresses the "A" button. In this example, the historical sensor data 118 that is to be labeled might be sensor data 118 generated by a gyroscope of the game controller 106, and the game control data 116 accessed at block 408 may include data corresponding to a depression of the "A" button that was received from a client machine 112 of the player 110 after a time period (e.g., 100 milliseconds) since the gyroscope-based sensor data 118 was received from the same client machine 112. As another illustrative example, it may be the case that a particular player 110 transitions between selecting the "A" button and selecting the "B" button. In this example, the historical sensor data 118 that is to be labeled might be sensor data 118 generated by touch sensors (e.g., capacitive pads) associated with the "A" and "B" buttons—which may indicate decreasing capacitive values on the "B" button after a release of the "B" button along with increasing capacitive values on the "A" button, and the game control data 116 accessed at block 408 may include data corresponding to a depression of the "A" button that was received from a client machine 112 of the player 110 after a time period (e.g., 50 milliseconds) since the touch sensor-based sensor data 118 was received from the same client machine 112. In yet another example, historical game state data 126 that is to be labeled may include a game state of a video game 120 where a game character is located next to a wall in the game map and the character is running directly towards the wall. In this example, the game control data 116 accessed at block 408 may include a "jump" action corresponding to a depression of the "A" button that was received from a client machine 112 after a time period (e.g., 20 milliseconds) since the game state occurred in the video game 120. This type of game control data 116 (e.g., a "jump" action of a player-controlled character) may be exhibited in game sate data 126 of the video game 120 for this particular game state over hundreds of millions of past game sessions, meaning that most players always control their game character to jump over the wall if the character is running directly toward the wall and is next to the wall within a certain time period of the jump action.

At 410, the computing system 102, via the training component 308, may label data (e.g., the historical sensor data 118 and/or the historical game state data 126) with a label that indicates one of multiple types of user input corresponding to the historical game control data 116 received within the time period (i.e., the historical game control data 116 accessed at block 408). Examples of labels are described herein, such as the various types/classes of user input described herein with reference to FIG. 3. With reference to the examples set forth in the previous paragraph, the gyroscope-based sensor data 118 that was received 100 milliseconds prior to receipt of game control data 116 corresponding to a depression of the "A" button might be labeled with—"A" button: Depress". Likewise, the touch sensor-based sensor data 118 that was received 50 milliseconds prior to receipt of game control data 116 corresponding to a depression of the "A" button might be labeled with the same label—"A" button: Depress". Likewise, the game state data 126 that includes the game state that occurred 20 milliseconds prior to receipt of game control data 116 corresponding to a depression of the "A" button might be labeled with the same label—"A" button: Depress".

At 412, the computing system 102, via the training component 308, may train a machine learning model(s) using the (historical) data 314 (e.g., the historical sensor data 118 and/or the historical game state data 126) as training data to obtain the trained machine learning model(s) 104. As shown by sub-block 414, the training of the machine learning model(s) at block 412 may include setting weights for machine learning. These weights may apply to a set of features derived from the historical data 314. Example features are described herein. In some embodiments, the weights set at block 314 may apply to parameters that are internal to the machine learning model(s) (e.g., weights for neurons in a hidden-layer of a neural network). These internal parameters of the machine learning model(s) may or may not map one-to-one with individual input features of the set of features. As shown by sub-block 416, the training of the machine learning model(s) at block 412 may include determining a prediction error, and using the prediction error to train the model(s) 104. For example, this may be implemented as an error-driven learning technique (a type of reinforcement learning) where the machine learning model(s) being trained are tasked with predicting the outputs based on the sample training data provided as input, and the training component 308 determines (e.g., measures) the prediction error of the model's prediction, which may be based on the labels from the training data (e.g., the known correct output values, often referred to as ground truth data). The training component 308 may then feed the prediction error back through the model(s) to improve the performance of the model during the training process. As shown by the arrow from block 412 to block 404, the machine learning model(s) 104 can be retrained using updated (historical) data 314 to obtain a newly trained machine learning model(s) 104 that is adapted to recent player behaviors. This allows the machine learning model(s) 104 to adapt, over time, to changing player behaviors.

It is to be appreciated that the sampled historical data 314 used to train the machine-learning model(s) 104 may be any suitable data in addition to the training data described with reference to the process 400. For example, user input data itself (e.g., buttons pressed, controls actuated, etc.) may be used as training data to predict a type of user input that will be provided to the game controller 106. For example, players 110 may actuate controls in a particular sequence to carry out special maneuvers of a player-controlled character in a video game 120, such as in a fighting/combat video game where certain sequences of button presses may cause a game character to fire a special weapon or maneuver in a special manner. Accordingly, the training module 308 can access game control data 116 received within a time period of particular sequences of button presses to train the machine learning model(s) to predict when a player 110 is about to complete a special maneuver in a video game 120.

Furthermore, it is to be appreciated that the training of the machine learning model(s) 104 with the process 400, for example, can be on a per-player basis and/or a player community basis. In a per-player training example, the machine learning model(s) 104 can be trained on data 314 associated with a user account of a particular player 110 to learn to predict user input that the particular player 110 will provide to his/her game controller 106. In a player community training example, the machine learning model(s) 104 can be trained on data 314 associated with a plurality of user accounts of a player community to learn to predict user input that a general player 110 will provide to his/her game controller 106. This latter training approach may be useful if there isn't enough data 314 associated with a single player to accurately predict that player's 110 behavior.

Figure 5:
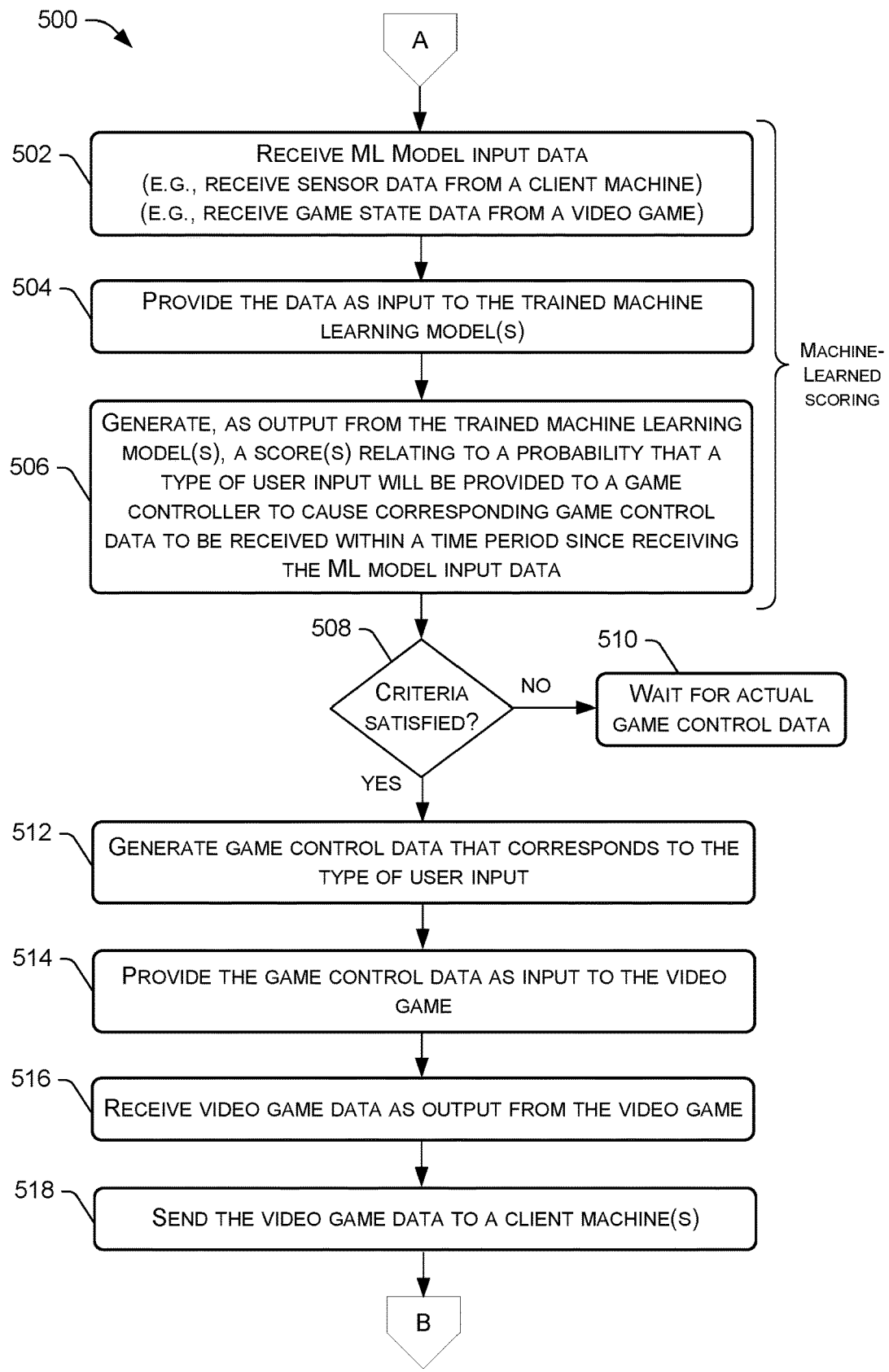
FIG. 5 is a flow diagram of an example process for utilizing a trained machine learning model(s) to predict user input to a player's game controller, and using the machine-learned prediction of the user input to generate game control data ahead of time in order to compensate for latency.

FIG. 5 is a flow diagram of an example process 500 for utilizing a trained machine learning model(s) 104 to predict user input to a player's game controller 106, and using the machine-learned prediction of the user input to generate game control data 108 ahead of time in order to compensate for latency. For discussion purposes, the process 500 is described with reference to the previous figures. Furthermore, as indicated by the off-page reference "A" in FIGS. 4 and 5, the process 500 may continue from block 412 of the process 400.

At 502, the computing system 102 may receive data that is to be provided to a trained machine learning model(s) 104 as input data. This data received at block 502 may include sensor data 118 that was generated by a game controller 106. The sensor data 118 received at block 502 may include, without limitation, capacitance values, resistance values, displacement values, velocity values, acceleration values, temperature values, humidity values, etc. In some embodiments, the sensor data 118 is raw sensor data (e.g., raw gyroscope data, raw accelerometer data, raw capacitive sensor data, etc.) such that the values in the sensor data 118 represent raw (e.g., unfiltered, unamplified) values generated by a physical sensor(s) 202 of a game controller 106. Furthermore, if the computing system 102 is a remote computing system 102, the sensor data 118 received at block 502 may be received from a first client machine 112(A) associated with a first player 110(A) of a video game 120 (e.g., a video game 120 being played in multiplayer mode with a second player 112(B)). However, it is to be appreciated that a client machine 112 itself may receive the data at block 502 from a remote system 102, or from a local game controller 106.

Additionally, or alternatively, the data received at block 502 may include game state data 126 that was received from a video game 120 (e.g., a video game executing in multi-player mode for at least the first player 110(A) and the second player 110(B)). The game state data 126 may include a current game state of the video game 120, such as the current player movement, the current position of a game character in a game map, a current character class, a currently-selected weapon, and the like.

At 504, the computing system 102, via the scoring component 310, may provide at least some of the data received at block 502 as input to the trained machine learning model(s) 104 for purposes of predicting user input that a player 110 will provide to a game controller 106, which will cause corresponding game control data 116 to be received from the player's client machine 112 within a time period since the receiving of the data at block 502. For example, the sensor data 118 may be provided as input to the trained machine learning model(s) 104 to predict a type of user input that the first player 110(A) will provide to the game controller 106, thereby causing corresponding game control data 116 to be received from the first client machine 112(A) in the next N milliseconds, where N may be any suitable value, such as a value within a range of about 1 millisecond to 200 milliseconds. As another example, the game state data 126 may be provided as input to the trained machine learning model(s) 104, either in lieu of the sensor data 118, or as additional input to along with the sensor data 118, to predict a type of user input the first player 110(A) will provide to the game controller 106. In some embodiments, a history of sensor data 118 and/or a history of game state data 126 (e.g., data received over the last P milliseconds) may be provided as input to the trained machine learning model(s) 104 at block 504. For instance, the trained machine learning model(s) 104 may learn to predict that a player 110 will press the "B" button shortly after the player 110 has been pressing the "A" button at an above-threshold amount of force for an above-threshold amount of time. Similarly, ramping (e.g., decreasing or increasing) sensor values may be indicative of a forthcoming type of user input.

At 506, the computing system 102, via the scoring component 310, may generate, as output from the trained machine learning model(s) 104, a score(s) 128 relating to, or indicative of, a probability (or probabilities) that a type(s) of user input will be provided to a game controller 106 associated with a player 110 (e.g., the first player 110(A)) of the video game 120 to cause corresponding game control data 116 to be generated within a time period (e.g., N milliseconds) since the receiving of the data at block 502. The type of user input that is assigned a score at block 506 may include, without limitation, actuation of a particular finger-operated control (e.g., a button, a joystick, a D-pad, etc.) of the game controller 106, movement of the game controller 106 in a particular direction (e.g., X, Y, or Z direction of translational movement, and/or a direction (e.g., clockwise or counterclockwise) of roll, pitch, or yaw rotational movement), an object hovering over, or contacting, a particular portion (e.g., the handle, a surface, a finger-operated control, etc.) of the game controller 106, or the object pressing upon a portion of the game controller 106 with a particular amount of force. For example, these types of user input may relate to actions that are intended to cause a player-controlled character to jump (e.g., depressing the "A" button may cause the game character to jump), to turn left or right (e.g., depressing the D-pad, deflecting the joystick, or rotating the game controller 106 may cause the game character to turn left or right), to fire a weapon (e.g., depressing the "B" button may cause a weapon to be fired), and the like. In some embodiments, the score 128 is a variable that is normalized in the range of [0,1]. This score 128 may have a monotonic relationship with a probability that a type of user input will be provided to the game controller 106. The relationship between the score 128 and the actual probability associated with the particular type of user input, while monotonic, may or may not be a linear relationship.

At 508, a determination may be made as to whether one or more criteria are satisfied. For example, the machine-learned score 128 generated at block 506 may be evaluated against a threshold score to determine if the score 128 satisfies (e.g., exceeds, meets or exceeds, etc.) the threshold score. Thus, an example criterion is satisfied at block 508 if the score 128 satisfies a threshold score. The threshold score may be associated with the particular type of user input that the score 128 is assigned to, such that different threshold scores are associated with different types of user input. This allows the system to proactively generate game control data 108 in a conservative manner for more performance-critical player actions. For example, if a player 110 is currently controlling their character to hide behind a barrier in the video game 120 to avoid being killed by enemy fire, and the score 128 relates to a probability that a D-pad will be depressed in a particular direction that would position the game character in the line-of-fire, potentially subjecting the game character to being killed in the video game 120, a relatively high threshold score may be associated with this performance-critical type of user input so that the system does not proactively generate corresponding game control data 108 to move the game character away from cover unless the score 128 associated with that type of user input satisfies the relatively high threshold score. It can be appreciated that other types of user input that are not as impactful on the play quality of the game may be associated with relatively lower threshold scores so that latency can be compensated for more often with those types of user input. However, in some embodiments, even performance critical types of user input may benefit from latency compensation, such as firing a weapon in a timely manner to hit a target. The evaluation at block 508 may take into consideration accuracy statistics of predicting certain types of user input for this purpose. For example, if the system accurately predicts a certain type of user input 99.99% of the time, the threshold score at block 508 may be relatively low to allow for proactively generating corresponding game control data 108 to reduce latency, whereas, for other types of user input that the system is not as good at predicting, a relatively high threshold score may be used at block 508 to mitigate the false positive rate of the predictions.

Another example criterion that may be evaluated at block 508 is whether the type of user input in question is categorized as a type of user input for which game control data is to be proactively generated on behalf of players to compensate for latency. For example, the datastore 124 accessible to the computing system 102 can tag certain types of user input as ones for which the system is to proactively generate game control data 108, while other types of user input may be tagged as being excluded from consideration. In other words, there may be certain types of user input for which it is not deemed beneficial to predict on behalf of players 110, and it is better to wait for actual game control data 116 corresponding to those types of user input. Thus, an example criterion is satisfied at block 508 if it is determined that the type of user input that is assigned the score 128 at block 506 is one of the types of user input for which game control data 108 is to be proactively generated on behalf of players 110. In some embodiments, the threshold scores and/or the categorizations of types of user input to consider for proactively generating game control data 108 may be at least partially dictated by user settings. For example, a user 110 may specify how much or how little they would like the system to compensate for latency, and/or which types of user input the user 110 wants the system to predict on his/her behalf. Furthermore, the threshold scores and/or the categorizations of types of user input may be game-specific, such that, for some video games 120, certain types of user input are predicted, whereas, for other video games 120, those types of user input are not predicted.

If the one or more criteria are not satisfied at block 508, the process 500 may follow the "NO" route from block 508 to block 510, where the computing system 102 may wait for actual game control data 116 instead of proactively generating game control data 108 on behalf of the user for the predicted type of user input. For example, this may be the case if the score 128 for the type of user input did not satisfy a threshold score associated with that type of user input, and/or if the type of user input is not categorized as one for which game control data 108 is to be proactively generated. If the one or more criteria are satisfied at block 508, the process 500 may follow the "YES" route from block 508 to block 512.

At 512, the computing system 102, via the game control data generator 312, may generate game control data 108 that corresponds to the type of user input associated with the score 128 generated at block 506. The generation of the game control data 108 at block 512 is done proactively, before actual, forthcoming game control data 116 is generated. The datastore 124 may maintain mappings from types of user input to game control data 108 so that the computing system 102 can generate game control data 108 that looks as if it was generated by a game controller 106.

At 514, the computing system 102, via the game control data generator 312, may provide the game control data 108 as input to the video game 120. At 516, the computing system 102, via the game control data generator 312, may receive video game data 122 as output from the video game 120 based at least in part on the game control data 108 that was proactively generated on behalf of the player 110. At 518, the computing system 102, may send, over the computer network 114, the video game data 122 to a client machine(s) 112. For example, in a multiplayer video game scenario, the game control data 108 generated at block 512 may be generated on behalf of a first player 110(A) based on a prediction that the first player 110(A) will provide a certain type of user input to his/her game controller 106(A), and the video game data 122 sent at block 518 may be sent to a second client machine 112(B) of a second player 110(B) who is playing the video game 120 in multiplayer mode with the first player 110(A). It is to be appreciated that video game data 112 may be sent to any number of client machines 112 in this manner. By sending the video game data 122 to the client machine(s) 112 at block 518, the remote system 102 can be considered to be causing presentation of the video game data 122 on a display of the client machine 112, because the client machine(s) 112 receives the video game data 122 and presents the video game data 122 on a display of the client machine(s) 112. It is to be appreciated, however, that a trained machine learning model(s) 104 and/or a video game 120 may execute locally on a client machine 112, and in these embodiments, video game data 122 may be generated on the client machine 112, and the process 500 may therefore omit block 518 in these embodiments. In these embodiments, the remote system 102 may send other data, such as the data received at block 502, to the client machine(s) 112 over the computer network 114, and the client machine 112(B) may generate the video game data 122 locally and present the video game data 122 on a display of the client machine 112(B). When a computer network 114 is omitted, the client machine 112 may receive the data at block 502 directly from a game controller 106 and/or from a component of the client machine 112 (e.g., from the video game 120 executing thereon), and the client machine 112(A) may generate the video game data 122 and present the video game data 122 on a display of the client machine 112(A).

Accordingly, the process 500 illustrates a technique for predicting what a targeted player 110 is about to do in a video game 120, proactively generating corresponding game control data 108 on behalf of that targeted player 110, and using the game control data 108 to compensate for latency of the video game platform such that other players 110 see what the targeted player 110 does at the time that the targeted player 110 does it (assuming the prediction of the targeted player's 110 user input to the game controller 106 is accurate). Using this technique, each client machine 112 receives data that mimics a setup where the game controllers 106 of all players 110 connected over the network 114 are directly connected to the client machine 112. Thus, the trained machine learning model(s) 104 is utilized to predict what other players are doing at the present moment, even though the actual game control data 116 has not been received from those players 110 yet. This allows game characters of other players 110 to behave in a more realistic manner. In the example of FIG. 1, for instance, sensor data 118 input to the trained machine learning model(s) 104 may indicate that the game controller 106(A) is starting to twist to the right, and the prediction may be that the first player 110(A) is likely to depress the "A" button in the next N milliseconds. As another example, if the game state data 126 input to the trained machine learning model(s) 104 indicates that the first player's 110(A) character is running directly towards a wall, and the system has not received game control data 116 in the last 200 milliseconds, which is long enough for the character to run up and hit the wall, the prediction may be that the first player 110(A) is likely to depress the "A" button in the next N milliseconds, because game state data for millions of past game sessions indicate that almost everyone jumps over the wall at the same game state as the first player 110(A). In some cases, the compensation for latency on the order of 200 milliseconds or less may sometimes mean the difference between success or failure (e.g., life or death of a game character) in a video game 120. Thus, the latency compensation techniques that use machine-learned prediction of user input to a game controller 106 correctly regulates the interplay between players 110 of a multiplayer game (e.g., players 110 are not unfairly penalized due to latency of the video game platform). As mentioned, the machine-learned prediction of user input also allows for animation enhancements to be utilized to create a more realistic appearance of the video game content. For example, lead-in animations for a predicted "jump" of a game character can be rendered, such as a shifting of weight or a crouching movement of the game character just prior to jumping.

Figure 6:
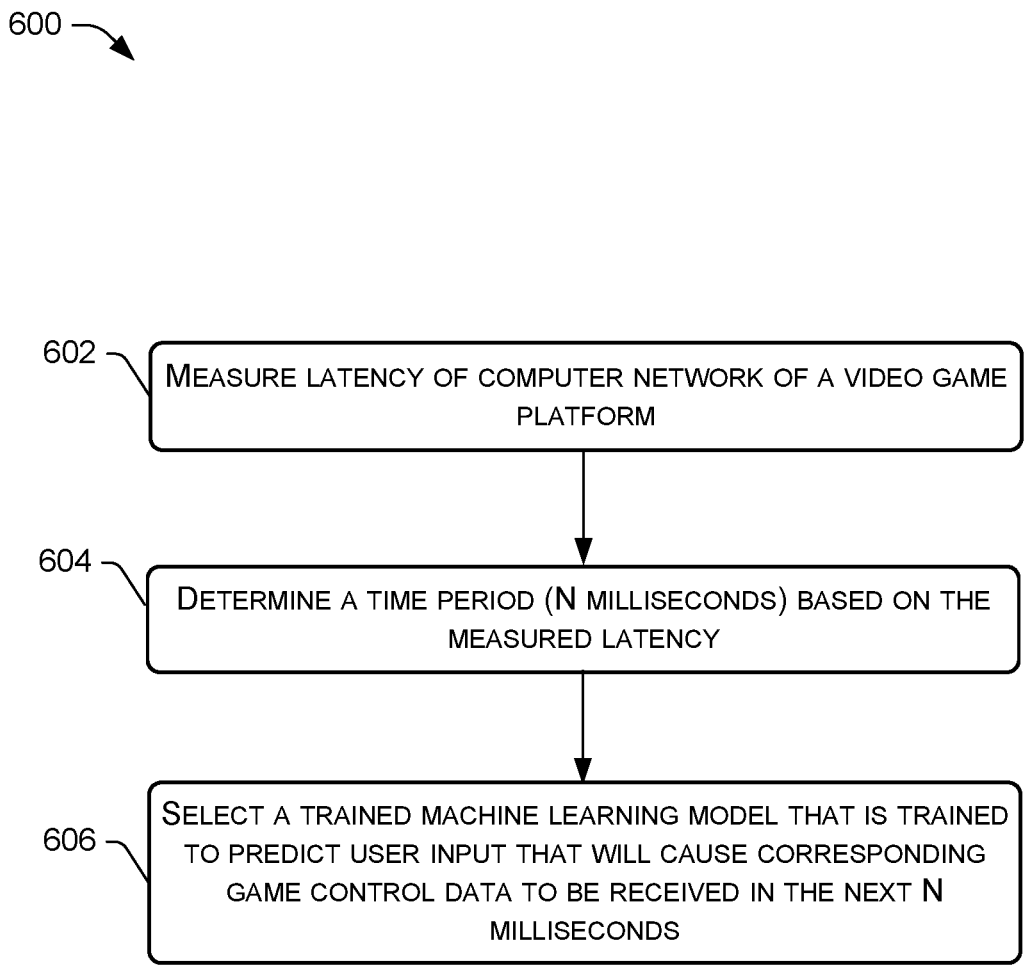
FIG. 6 is a flow diagram of an example process for measuring a latency of a computer network, and selecting one of multiple trained machine learning models to use in predicting user input to game controllers based on the measured latency.

FIG. 6 is a flow diagram of an example process 600 for measuring a latency of a computer network 114, and selecting one of multiple trained machine learning models 104 to use in predicting user input to game controllers 106 based on the measured latency. For discussion purposes, the process 600 is described with reference to the previous figures.

At 602, the computing system 102 may measure a latency of the computer network 114 to which client machines 112 are connected for interacting with a video game service. The latency of the network may be measured as a value that indicates how long the data is delayed during transit to obtain a measured latency value at block 602. This measurement may be performed periodically, at the start of a new game session and/or during the game session, or at any other suitable time (e.g., triggered by an event).

At 604, the computing system 102 may determine a time period (e.g., a time period of N milliseconds) over a range of possible time periods, based at least in part on the measured latency value. For example, a higher latency value—which may indicate that the network 114 is relatively slow and that the delay during transit is relatively high due to congestion or otherwise—may correspond to a longer time period, whereas a lower latency value—which may indicate that the network 114 is relatively fast and that the delay during transit is relatively low—may correspond to a shorter time period. The datastore 124 may maintain mappings from latency values to time periods for this purpose, or the time period may be calculated based on a function where latency is a variable of the function.

At 606, the computing system 102 may select a trained machine learning model 104, from multiple available trained machine learning models, based at least in part on the time period determined at block 604. For example, machine learning models 104 may be trained to predict forthcoming user input to game controllers 106 that will occur within different time periods. For example, a first trained machine learning model 104 may be trained to predict user input that will cause corresponding game control data 116 to be received within the next 5 milliseconds, while a second trained machine learning model 104 may be trained to predict user input that will cause corresponding game control data 116 to be received within the next 200 milliseconds. Thus, based on the measured latency, the system can dynamically select an appropriate machine learning model(s) 104 for predicting a certain amount of time in the future. The variance in how far ahead to predict may be based on the topology of the network (e.g., a machine learning model 104 that predicts farther ahead in the future may be used for a wide area network, while a machine learning model 104 that predicts over shorter durations may be used for in-home streaming platforms or local prediction when the machine learning model(s) 104 executes on the client machine 112, such as for triggering "lead in" animations).

Figure 7:
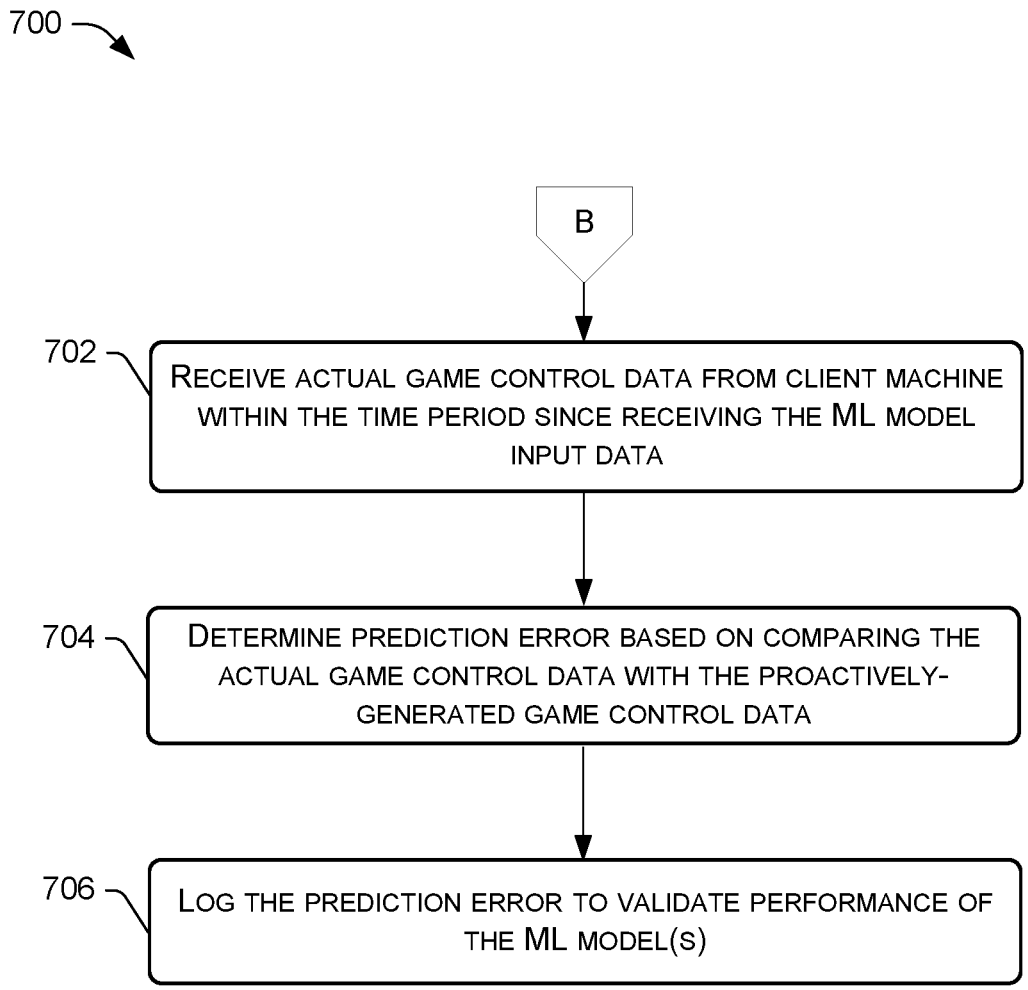
FIG. 7 is a flow diagram of an example process for comparing actual game control data with game control data that was proactively generated based on machine-learned predictions of user input to determine a prediction error, and logging the prediction error for purposes of validating the performance of the model(s).

FIG. 7 is a flow diagram of an example process 700 for comparing actual game control data 116 with game control data 108 that was proactively generated based on machine-learned predictions of user input to determine a prediction error, and logging the prediction error for purposes of validating the performance of the model(s) 104. For discussion purposes, the process 700 is described with reference to the previous figures. Furthermore, as indicated by the off-page reference "B" in FIGS. 5 and 7, the process 700 may continue from block 518 of the process 500.

At 702, after proactively generating game control data 108 on behalf of a player 110 in the process 500, the computing system 102 may subsequently receive, actual game control data 116 associated with the player 110 within a time period since the receiving of the data that was input to the trained machine learning model(s) 104. If the prediction was accurate, the actual game control data 116 will match the proactively generated game control data 108. If the prediction was inaccurate, the actual game control data 116 will not match the proactively generated game control data 108.

At 704, the computing system 102 may determine a prediction error based at least in part on comparing the actual game control data 116 received at block 702 with the game control data 108 that was proactively generated at block 512 of the process 500 in order to compensate for latency.

At 706, the computing system 102 may log the prediction error in a database of logged prediction errors so that prediction errors can be tracked over time and statistics can be generated for predictions of particular types of user input to game controllers 106. These logged prediction errors can be utilized to validate the performance of the trained machine learning model(s) 104, such as by checking whether the model(s) 104 is behaving as expected and performing at a desired level of performance.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
   receiving, by a computing system, sensor data associated with a player of a video game, the sensor data having been generated by at least one of a gyroscope of a game controller associated with the player, an accelerometer of the game controller, a pressure sensor of the game controller, or a biofeedback sensor on or in proximity to the player;
   predicting, by the computing system, user input to the game controller that will cause corresponding game control data to be received by the computing system within a time period since the receiving of the sensor data by:
      providing the sensor data as input to a trained machine learning model; and
      generating a score as output from the trained machine learning model, the score indicative of a probability that a type of user input will be provided to the game controller;
   after the generating of the score and prior to proactively generating game control data that corresponds to the type of user input, accessing data indicating types of user input for which respective game control data is to be generated on behalf of players to compensate for latency;
   determining that the type of user input is one of the types of user input;
   in response to the determining that the type of user input is one of the types of user input, proactively generating, by the computing system, in advance of receiving actual game control data from a client machine associated with the player, the game control data based at least in part on the score;
   providing the game control data as input to the video game;
   receiving video game data as output from the video game based at least in part on the game control data; and
   causing, by the computing system, presentation of the video game data on a display without waiting for the actual game control data to be received by the computing system from the client machine.

2. The method of claim 1, wherein the type of user input comprises at least one of:
   actuation of a particular finger-operated control of the game controller;
   movement of the game controller in a particular direction;
   an object hovering over, or contacting, a particular portion of the game controller; or
   the object pressing upon a portion of the game controller with a particular amount of force.

3. The method of claim 1, further comprising:
   prior to the predicting, receiving, by the computing system, game state data from the video game; and providing the game state data as additional input to the trained machine learning model in addition to the providing of the sensor data as the input to the trained machine learning model,
wherein the score is generated based at least in part on the game state data provided as the additional input to the trained machine learning model.

4. The method of claim 1, further comprising, prior to the receiving of the sensor data:
accessing, by the computing system, historical sensor data generated during past sessions of the video game or past sessions of a different video game;
accessing, by the computing system, historical game control data generated within a second time period since the historical sensor data was received;
labeling the historical sensor data with a label that indicates one of multiple types of user input corresponding to the historical game control data received within the second time period; and
training a machine learning model using the historical sensor data as training data to obtain the trained machine learning model.

5. The method of claim 1, wherein the time period is within a range of 1 millisecond to 200 milliseconds.

6. The method of claim 1, wherein the client machine is a first client machine, wherein the sensor data is received over a computer network from the first client machine, and wherein the causing the presentation of the video game data on the display comprises sending the video game data to a second client machine over the computer network, the method further comprising:
measuring a latency of the computer network to obtain a measured latency value;
determining the time period based at least in part on the measured latency value; and
selecting the trained machine learning model from multiple trained machine learning models based at least in part on the time period.

7. The method of claim 1, wherein the causing the presentation of the video game data on the display comprises causing presentation of at least one of an animation associated with the type of user input or a lead-in animation associated with the animation.

8. The method of claim 1, further comprising:
receiving actual game control data from a client machine associated with the player within the time period since the receiving of the sensor data; and
determining a prediction error based at least in part on comparing the actual game control data with the game control data.

9. The method of claim 1, further comprising:
prior to the proactively generating the game control data, determining that the score satisfies a threshold score associated with the type of user input, the threshold score being one of a plurality of different threshold scores associated with different types of user input,
wherein the proactively generating the game control data is based at least in part on the score satisfying the threshold score.

10. A method comprising:
receiving, by a computing system, sensor data associated with a player of a video game, the sensor data having been generated by at least one of a gyroscope of a game controller associated with the player, an accelerometer of the game controller, a pressure sensor of the game controller, or a biofeedback sensor on or in proximity to the player;
providing the sensor data as input to a trained machine learning model;
generating, as output from the trained machine learning model, a score relating to a probability that a type of user input will be provided to the game controller to cause corresponding game control data to be received by the computing system within a time period since the receiving of the sensor data;
after the generating of the score and prior to proactively generating game control data that corresponds to the type of user input, accessing data indicating types of user input for which respective game control data is to be generated on behalf of players to compensate for latency;
determining that the type of user input is one of the types of user input;
in response to the determining that the type of user input is one of the types of user input, proactively generating, by the computing system, in advance of receiving actual game control data from a client machine associated with the player, the game control data;
providing the game control data as input to the video game;
receiving video game data as output from the video game; and
causing, by the computing system, presentation of the video game data on a display without waiting for the actual game control data to be received by the computing system from the client machine.

11. The method of claim 10, wherein the type of user input comprises at least one of:
actuation of a particular finger-operated control of the game controller;
movement of the game controller in a particular direction;
an object hovering over, or contacting, a particular portion of the game controller; or
the object pressing upon a portion of the game controller with a particular amount of force.

12. The method of claim 10, further comprising, prior to the receiving of the sensor data:
accessing, by the computing system, historical sensor data generated during past sessions of the video game or past sessions of a different video game;
accessing, by the computing system, historical game control data generated within a second time period since the historical sensor data was received;
labeling the historical sensor data with a label that indicates one of multiple types of user input corresponding to the historical game control data received within the second time period; and
training a machine learning model using the historical sensor data as training data to obtain the trained machine learning model.

13. The method of claim 10, further comprising:
receiving, by the computing system, game state data from the video game; and
providing the game state data as additional input to the trained machine learning model in addition to the providing of the sensor data as the input to the trained machine learning model,
wherein the score is generated based at least in part on the game state data provided as the additional input to the trained machine learning model.

14. The method of claim 10, further comprising:
prior to the proactively generating the game control data, determining that the score satisfies a threshold score associated with the type of user input, the threshold score being one of a plurality of different threshold scores associated with different types of user input, wherein the proactively generating the game control data is based at least in part on the score satisfying the threshold score.

15. The method of claim 10, wherein the causing the presentation of the video game data on the display comprises causing presentation of at least one of an animation associated with the type of user input or a lead-in animation associated with the animation.

16. The method of claim 10, further comprising:
receiving actual game control data from a client machine associated with the player within the time period since the receiving of the sensor data; and
determining a prediction error based at least in part on comparing the actual game control data with the game control data.

17. The method of claim 10, wherein the time period is within a range of 1 millisecond to 200 milliseconds.

18. A system comprising:
one or more processors; and
memory storing computer-executable instructions that, when executed by the one or more processors, cause the system to:
receive sensor data associated with a player of a video game, the sensor data having been generated by at least one of a gyroscope of a game controller associated with the player, an accelerometer of the game controller, a pressure sensor of the game controller, or a biofeedback sensor on or in proximity to the player;
provide the sensor data as input to a trained machine learning model;
generate a score as output from the trained machine learning model, the score indicative of a probability that a type of user input will be provided to the game controller to cause corresponding game control data to be received by the system within a time period since the receiving of the sensor data;
after generating the score and prior to proactively generating game control data that corresponds to the type of user input, access data indicating types of user input for which respective game control data is to be generated on behalf of players to compensate for latency;
determine that the type of user input is one of the types of user input;
in response to determining that the type of user input is one of the types of user input, proactively generate, in advance of receiving actual game control data from a client machine associated with the player, the game control data;
provide the game control data as input to the video game;
receive video game data as output from the video game; and
cause presentation of the video game data on a display without waiting for the actual game control data to be received by the system from the client machine.

19. The system claim 18, wherein the type of user input comprises at least one of:
actuation of a particular finger-operated control of a game controller;
movement of the game controller in a particular direction;
an object hovering over, or contacting, a particular portion of the game controller; or
the object pressing upon a portion of the game controller with a particular amount of force.

20. The system of claim 18, wherein the computer-executable instructions, when executed by the one or more processors, further cause the system to:
prior to proactively generating the game control data, determine that the score satisfies a threshold score associated with the type of user input, the threshold score being one of a plurality of different threshold scores associated with different types of user input,
wherein the proactively generating the game control data is based at least in part on the score satisfying the threshold score.

21. The system of claim 18, wherein the computer-executable instructions, when executed by the one or more processors, further cause the system to:
receive actual game control data from a client machine associated with the player within the time period since the receiving of the sensor data; and
determine a prediction error based at least in part on comparing the actual game control data with the game control data.

22. The system of claim 21, wherein the computer-executable instructions, when executed by the one or more processors, further cause the system to:
log the prediction error in a database of logged prediction errors.

23. The system of claim 18, wherein causing the presentation of the video game data on the display comprises causing presentation of at least one of an animation associated with the type of user input or a lead-in animation associated with the animation.

* * * * *